US00RE45377E

(19) United States
(12) Reissued Patent
Pounder et al.

(10) Patent Number: US RE45,377 E
(45) Date of Reissued Patent: Feb. 17, 2015

(54) UPRIGHT, EARLY SUPPRESSION FAST RESPONSE SPRINKLER

(71) Applicant: Tyco Fire Products LP, Lansdale, PA (US)

(72) Inventors: Donald B. Pounder, North Kingston, RI (US); Michael A. Fischer, West Kingston, RI (US)

(73) Assignee: Tyco Fire Products LP, Lansdale, PA (US)

(21) Appl. No.: 13/928,176

(22) Filed: Jun. 26, 2013

Related U.S. Patent Documents

Reissue of:
(64) Patent No.: 7,819,201
Issued: Oct. 26, 2010
Appl. No.: 10/384,736
Filed: Mar. 11, 2003

U.S. Applications:
(63) Continuation of application No. 13/213,721, filed on Aug. 19, 2011, now Pat. No. Re. 44,329, which is an application for the reissue of Pat. No. 7,819,201.

(51) Int. Cl.
*A62C 37/08* (2006.01)

(52) U.S. Cl.
USPC ..... 169/37; 169/39; 169/16; 169/42; 239/498; 239/518

(58) Field of Classification Search
USPC ..... 169/37, 39, 16, 42; 239/498, 518
See application file for complete search history.

(56) References Cited

U.S. PATENT DOCUMENTS 433,477 A 8/1890 Meyer et al.
575,121 A 1/1897 Lapham (Continued)

FOREIGN PATENT DOCUMENTS

CA 2324436 11/2001
DE 112004000427 1/2006

(Continued)

OTHER PUBLICATIONS

Defendant Victaulic—First Amended Answer to Second Amended Complaint—First Amended Affirmative Defenses, and Counterclaims of the Defendant to the Second Amended Complaint (Served Apr. 26, 2011).

(Continued)

*Primary Examiner* — Dinh Q Nguyen
(74) *Attorney, Agent, or Firm* — Perkins Coie LLP

(57) ABSTRACT

An upright ESFR sprinkler includes a generally tubular body, at least one frame arm, a closure assembly, an unactuated heat responsive trigger assembly and a deflector assembly with a K-factor greater than 14, and preferably 16.8. The passageway extends between inlet and outlet openings. The closure is positioned proximate the outlet so as to occlude the passageway with a Bellville seal being. An ejection spring is coupled to the closure assembly. The heat responsive trigger assembly has a Response Time Index of 40 meter$^{1/2}$second$^{1/2}$ (m$^{1/2}$ sec$^{1/2}$) or less. The deflector assembly includes a nosepiece and a plate like redirecting member. The plate like redirecting member faces the outlet and is coupled to the at least one frame arm and spaced from the outlet opening. The plate shaped member includes a first generally planar portion, a conical second portion, and a third portion extending from the conical second portion. The third portion includes a plurality of tines and a plurality of slots with at least one slot disposed between every two tines so that, when the heat responsive trigger assembly is actuated and the closure is positioned to allow a density of water to flow from the outlet of the body so as to suppress a fire of a particular commodity situated beneath the ceiling of 35 feet or less. System and methods relating to the upright sprinklers are also provided.

13 Claims, 4 Drawing Sheets

(56) References Cited

U.S. PATENT DOCUMENTS

| | | | | |
|---|---|---|---|---|
| 3,888,313 | A | 6/1975 | Freeman | |
| 4,091,873 | A | 5/1978 | Werner | |
| 4,136,740 | A | 1/1979 | Groos et al. | |
| 4,580,729 | A | 4/1986 | Pounder | |
| 4,930,578 | A | 6/1990 | Barnett et al. | |
| 5,829,532 | A * | 11/1998 | Meyer et al. | 169/37 |
| 5,862,994 | A * | 1/1999 | Pounder et al. | 239/498 |
| 5,915,479 | A * | 6/1999 | Ponte | 169/46 |
| 6,059,044 | A * | 5/2000 | Fischer | 169/37 |
| 6,209,654 | B1 * | 4/2001 | Curless | 169/17 |
| 6,336,509 | B1 | 1/2002 | Polan et al. | |
| 6,450,265 | B1 | 9/2002 | Ponte | |
| 6,502,643 | B1 * | 1/2003 | Meyer et al. | 169/37 |
| 6,585,054 | B1 * | 7/2003 | Thomas et al. | 169/37 |
| 6,715,561 | B2 | 4/2004 | Franson | |
| 7,036,603 | B2 | 5/2006 | Thomas et al. | |
| 7,290,618 | B2 | 11/2007 | Thomas et al. | |
| 8,162,069 | B2 | 4/2012 | Multer et al. | |
| 2003/0079889 | A1 | 5/2003 | Meyer et al. | |
| 2005/0224238 | A1 | 10/2005 | Thomas et al. | |

FOREIGN PATENT DOCUMENTS

| | | |
|---|---|---|
| GB | 2415134 B | 12/2005 |
| JP | 11123250 | 11/1999 |

OTHER PUBLICATIONS

Defendant Victaulic—Defendant's Responses to Plaintiff's First Set of Interrogatories Directed to Defendant, (12 pages), (May 20, 2011).
Tyco Fire Products, Central Data Sheet of Model A 2.8, 4.2, 5.6 & 8.0 K-factor Standard Response Standard Coverage—Fusible Solder Type Automatic Sprinkler; Feb. 2001; 4 pages; No. 1-1.0.
Tyco Fire Products, Gem Data Sheet of Pendent & Upright Sprinklers, Std. Coverage, Model F892QR Designer; Mar. 2001; 4 pages; No. TD595A.
Tyco Fire Products, Data Sheet of Model EC-25, Extended Coverage Area Density Sprinklers 25.2 K-factory; Jan. 2003; 4 pages; No. TFP213.
Tyco Fire Products, Data Sheet of Series ELO-231FRB—11.2 K-factor Upright and Pendent Sprinklers Quick Response, Standard Coverage; Jan. 2003, 6 pages; No. TFP344.
Central Sprinkler Company, Central Fire Protection Products Catalog, Apr. 2001, 24 pages.
Star Sprinkler Inc., Star Product Catalog, 2000, 36 pages.
Plaintiff Tyco—Plaintiff's Opening Claim Construction Brief; Oct. 28, 2011; 60 page brief and exhibits 1-22.
Defendant Victaulic—Defendant's Initial Claim Construction Brief; Oct. 28, 2011; 88 page brief and exhibits 1-27.
Plaintiff Tyco—Plaintiff's Opposition Claim Construction Brief; Nov. 22, 2011; 76 page brief and exhibits 23-43.
Defendant Victaulic—Defendant's Responsive Claim Construction Brief; Nov. 22, 2011; 72 page brief and exhibits 28-37.
Eastern District of Pennsylvania Civil Docket from PACER for Case #: 5:10-cv-04645-ER dated Dec. 21, 2011. 14 pages.
Plaintiff's, Tyco Fire Products LP d/b/a Tyco Fire Suppression & Building Products, Claim Construction Hearing Presentation, Feb. 24, 2012, 122 pages.
Defendant's, The Victaulic Company, Claim Construction Hearing Presentation, Feb. 24, 2012, 113 pages.
United District Court for the Eastern District of Pennsylvania, Memorandum, Mar. 27, 2012, 105 pages.
United District Court for the Eastern District of Pennsylvania, Order, Mar. 27, 2012, 5 pages.
Defendant's Supplemental Responses to Plaintiff's Second Set of Interrogatories Directed to Defendant, May 29, 2012, plus prior art invalidity charts #1 and #2 for 7,819,201, 14 pages.
FM Technical Report entitled "Sprinkler Performance as Related to Size and Design, vol. II—Full-Scale Fire Tests," FMRC Serial No. 22437, RC-79-T-36, Jun. 1979.
NFPA 13 "Standard for the Installation of Sprinkler Systems," 2002 Edition.
NFPA 30, "Flammable and Combustible Liquid Code," National Fire Protection Association, 2000 Edition, pp. 30-1-30-116.
NFPA 30B, "Manufacture and Storage of Aerosol Products," National Fire Protection Association, 2002 Edition, pp. 30B-1-30B-54.
Factory Mutual System Updates, "Packaging in Transition," vol. II, No. 1.
Approval Standard, Factory Mutual Research Corporation, "Early Suppression-Fast Response (ESFR) Automatic Sprinklers," Class No. 2008, Factory Mutual System, Jun. 1996, pp. 1-47.
Underwiters Laboratories Inc., UL 1767, "Standard for Early-Suppression Fast-Response Sprinklers," First Edition Feb. 1990, Second Edition Jan. 27, 1995, ISBN 1-55909-705-8.
FM Global Property Loss Prevention Data Sheets 2-2, "Installation Rules for Suppression Mode Automatic Sprinklers," Sep. 2001, pp. 1-20.
FM Global Property Loss Prevention Data Sheets 8-0, "General Storage Safeguards," Mar. 1977, Revised Sep. 1998, pp. 1-11.
FM Global Property Loss Prevention Data Sheets 8-9, "Storage of Class 1, 2, 3, 4, and Plastic Commodities," Mar. 1997, Revised Sep. 2002, pp. 1-87.
FM Global Property Loss Prevention Data Sheets 8-24, "Idle Pallet Storage," Sep. 1992, Revised Sep. 2000, pp. 1-15.
Factory Mutual Research Draft Approval Standard Class Nos. 2008, 2026, 2032: Suppression Mode (Early Suppression-Fast Response [ESFR]) Automatic Sprinklers, Jun. 2000, pp. 1-75.
Factory Mutual Research Draft Approval Standard Class Nos. 2008, 2026, 2032: "Suppression Mode (Early Suppression-Fast Response [ESFR]) Automatic Sprinklers," Sep. 2000, pp. 1-10.
"Application of the Tyco Fire Products Model ESFR-17 Pendent Sprinkler," Sprinkler Identification No. (SIN) TY7226, Tyco Fire Products, Aug. 2001.
Technical Data, ESFR Upright Sprinkler (K=14.0) VK520, Viking Corporation, Dec. 2001.
Viking, Technical Data Sheet, Aquamiser Model B ESFR Upright Sprinkler:, 3 pages (Jul. 7, 1997).
Tyco Fire & Building Prods., "Application of the Tyco Fire & Building Products Model ESFR-17 Pendent/Upright Sprinklers," 23 pages (Sep. 2002).
James Golinveaux, "A Techical Analysis: The Use and Maintenance of Dry Type Sprinklers," 16 pages (Tyco Fire & Building Prods., Jun. 2002).
Tyco Fire & Building Prods., "Application of the Tyco Fire Products Model EC-25 Sprinkler"—20 pages (May 2001).
Tyco/Fire & Bldg. Products; Tech. Data, Series EC-11 & EC-14-11.2 and 14.0 K-factor Extended Coverage (Light and Ordinary Hazard) . . . Pendent Sprinklers, Dec. 2007, 8 sheets.
Hong-Zeng Yu et al; "Fire Performance Evaluation of a K-16.8 Suppression-mode Upright Sprinkler", Journal of Fire Protection Engineering, vol. 14, May 2004, pp. 101-124.
"Installation of Sprinkler Systems;" NFPA 13; 1999 Edition; National Fire Protection Association, p. 13-10 and 13-43 (3 pages).
Grinnell Corporation, Data Sheet, Conventional (Old Style) Sprinklers, Issue D Quartzoid, 11 mm, Bulb Type, K=5.6, ½" NPT, TD510M, Aug. 1999, 2 pages.
Grinnell Corporation, Data Sheet, Large Orifice Pendent and Upright Sprinklers, Model FR-1, Fast Response Solder Type, 17/32" Orifice—¾" NPT, ED526, Aug. 1992, 2 pages.
Grinnell Fire Protection Systems Co., Inc., Data Sheet, Upright and Pendent Sprinklers, Universal Model A Quick Response, 3 mm, Bulb Type, ⅜" Orifice, ½" NPT, TD513M, Jun. 1998, 3 pages.
Globe Fire Sprinkler Corporation, Data Sheet, Quick Response Model GL1123 Extra Large Orifice Automatic Sprinklers for Use in . . . 231D & 231F Systems, Bulletin GL1123, Rev. #3, Oct. 2002, 2 pages.
Reliable Automatic Sprinkler Company, Data Sheet, Model G XLO Extra Large Orifice Sprinkler, Bulletin 129, Rev. G, Jun. 2002, 2 pages.
Grinnell Corporation, Data Sheet, Universal Model A Quick Response, 3mm Bulb Type, 17/32" (20 mm) Orifice, ¾" NPT, TD525Q, Nov. 1998, 4 pages.

(56) References Cited

OTHER PUBLICATIONS

Grinnell Corporation, Data Sheet, Pendent, Recessed Pendent, and Upright Sprinklers, Universal Model A, Standard Response, 5 mm Bulb Type, 17/32" (20 mm) Orifice, ¾" NPT, TD526Q, Jan. 1996, 4 pages.
Grinnell Corporation, Data Sheet, Upright and Pendent Sprinklers, Model F950 Solder Type, ½" Orifice, TD517, Aug. 1984, 2 pages.
Grinnell Corporation, Data Sheet, Pendent, Recessed Pendent, and Upright Sprinklers, Model FR-1 Fast Response, Quick Response, Solder Type, ½" (15 mm) Orifice, ½" NPT, TD516, Nov. 1997, 4 pages.
Reliable Automatic Sprinkler Co., Data Sheet, Model G XLO-ECOH Extended Coverage Ordinary Hazard Upright Sprinkler, Bulletin 124, Jul. 1993, 2 pages.
Grinnell Fire Protection Systems Co., Inc., Data Sheet, Sprinklers, Nozzles and Accessories, Sec. 4/Quartzoid Sprinkler, Dec. 1973, 2 pages.
Grinnell Fire Protection Systems Co., Inc., Engineering Drawings, Large Orifice Sprinkler Duraspeed Type Issue "C" Assembly ½ NT and B6136, Feb. 1979, 1 page.
Grinnell Fire Protection Systems Co., Inc., Engineering Drawings, Large Orifice Sprinkler, Quartzoid Type Issue "D" Assembly, Apr. 1982, 1 page.
Perkins Engineering Co., Inc., Engineering Drawings, Sprinkler Deflector—Grunau—XLD Upright, Sep. 2, 1977, 1 page.
Grunau Sprinkler Corp., Parts List, Grunau—XLD Upright, Aug. 3, 1978, 1 page.
Grinnell Fire Protection Systems Co., Inc., Data Sheet, Large Orifice Sprinkler Duraspeed Type Issue "C", ¾" NPT Connection, Sep. 1, 1971, 1 page.
Grinnell Fire Protection Systems Co., Inc., Data Sheet, Jumbo Sprinkler Issue "A", Feb. 7, 1969, 1 page.
Grinnell Corporation, Data Sheet, Large Orifice Upright . . . Sprinklers, Issue D Bulb Type, 17/32" Orifice—½" NPT Connection, TD529Q, Aug. 1978, 2 pages.
Central Sprinkler Company, Ultra K-17, Specific Application, 30'-0" Building with 25"-0" Storage No In-Rack Sprinklers Required, No. 3-3-0, Nov. 1997, 4 pages.
Examination Report issued in related Great Britain Patent Application No. GB0520123.1, Mar. 13, 2007, 3 pages.
Examination Report issued in related Great Britain Patent Application No. GB0520123.1, Aug. 11, 2006, 3 pages.
Examination Report issued in related Great Britain Patent Application No. GB0520123.1, Feb. 14, 2006, 3 pages.
Globe Fire Sprinkler Corporation, Data Sheet, Model GL1167, Extra Large Orifice Automatic Sprinklers for Use in NFPA, 13, 231, 231C, 231D & 231F Systems, Bulletin GL1167, Rev. #1, Aug. 2002, 2 pages.

* cited by examiner

UPRIGHT, EARLY SUPPRESSION FAST RESPONSE SPRINKLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,819,201. This application is a continuation reissue of application Ser. No. 13/213,721, which is an application for reissue of U.S. Pat. No. 7,819,201.*

BACKGROUND OF THE INVENTION

An automatic sprinkler system is one of the most widely used devices for fire protection. The sprinklers are activated once the ambient temperature in an environment such as a room or a building exceeds a predetermined value. Once activated, the sprinklers distribute fluid in the room or building. The fluid distribution is believed to cool burning material by conversion of liquid to vapor; the vapor displaces the oxygen supply, thereby tending to smother the fire. Additionally, the fluid distribution may limit the supply of new fuel by moistening materials in the area; and the fluid may lower the ambient temperature in the vicinity by evaporative cooling.

Sprinklers may be designed for different fire protection applications. For occupancy type structures such as an office building, sprinklers have been designed with a relatively small orifice that can deliver a sufficient quantity of water "density" or water flow for a particular area, which can be determined in gallons-per-minute over the square footage of the area. This type of sprinklers is designed for delivery of a desired density that contains a fire within a particular area until other fire fighting techniques can be deployed.

For non-occupancy type structures such as a storage building or warehouse, sprinklers may be designed to suppress or to extinguish a fire shortly after ignition of a fire in a stored commodity. The commodities to be protected, for example, can be encapsulated, unencapsulated or cartoned commodities on plastic or wood pallets. These commodities have been classified by Factory Mutual Global ("FM Global") as Commodity Classes 1-4 and Plastics. Specific details of each class are given in three FM Global data sheets: FM Global DS 8-0 (September 1998), DS 8-9 (September 2002) and DS 8-24 (September 2000), which are hereby incorporated by reference. Because these sprinklers are preferably designed to actuate very quickly to suppress a fire, they are known as "Early Suppression Fast Response" sprinklers or ESFR sprinklers.

The ability of a sprinkler to suppress fire in a stored commodity is believed to be quantifiable, in part, by the concepts of Actual Delivered Density ("ADD") and Required-Delivered-Density ("RDD") developed by FM Global. Briefly, ADD is defined as the amount of water flow over an area (gallons per minute over square feet or "GPM/ft$^2$"), which is actually deposited by a particular ESFR sprinkler on top of a combustible package in order to achieve suppression. Through further developments by FM Global, an ADD testing apparatus can determine the ADD of a particular sprinkler configuration. RDD, on the other hand, is the minimum amount of water that must be delivered to the combustible fuel package in order to achieve suppression of a type of fire of a given commodity. RDD tends to increase over time and can be affected by the size of a fire at the time of sprinkler activation. Furthermore, the RDD value of a fire of a particular commodity tends to be fixed and therefore is presumed to be known. Given the assumption that RDD is the minimum amount of water needed to suppress a particular fire, the ADD of a particular ESFR sprinkler configuration can be higher than the RDD in order to effectively suppress a particular fire so that it does not spread beyond an initial ignition area. Thus, a particular fire protection system can be provided with sprinklers having an ADD greater than the RDD of the commodity that are to be protected.

The Performance requirements of ESFR sprinklers are set forth in Underwriters Laboratories, Inc., ("UL") Standard for Early-Suppression Fast-Response Sprinklers UL 1767(Section 7, Rev. Jan. 24, 2000 ), and, such ESFR sprinklers, are typically installed in accordance with the requirements of the National Fire Protection Association ("NFPA") standards including NFPA 13 (2002), NFPA 30 (2000), NFPA 30B (2002). Factory Mutual Global ("FM Global" or "FM") also has standards for ESFR sprinklers, particular, FM Approval Standard Class Nos. 2008, 2026, 2032 (June 2000 and Suppl. Sep. 2000), that set forth performance requirements of such ESFR sprinkler, and FM Global Properly Loss Prevention Data Sheets including DS 2-2 (September 2001), DS 8-9 (September 2002), DS 8-24 (September 2000), that address installation standards for the ESFR sprinkler. All of these current ESFR standards and all earlier ESFR standards of either organization are incorporated by reference herein in their entirety (hereafter referred to as "the Standard Documents").

The standards also specify a particular response time for ESFR sprinklers. Although ordinary or standard sprinklers are considered to have a response time index ("RTI") of 100 meter$^{1/2}$ second$^{1/2}$ ("m$^{1/2}$sec$^{1/2}$") or more, existing ESFR sprinklers must exhibit a response time indices of less than 40 m$^{1/2}$sec$^{1/2}$. Response time can be measured in various ways. FM Global and Underwriters Laboratories ("UL") use a combination of temperature ratings and response time indices to insure adequately fast response is being provided. The response time indices or "RTI" is a measure of thermal sensitivity and is related to the thermal inertia of a heat responsive element of a sprinkler. RTI is believed to be related to a heat transfer coefficient "h" and the velocity "u" of hot gas flowing past a heat responsive trigger element. For fast-growing industrial fires of the type to be protected by ESFR sprinklers, it is believed that the RTI of less than 40 m$^{1/2}$sec$^{1/2}$ and temperature rating of 165° F. or 214° F. of the trigger are sufficient to insure adequately fast sprinkler response. As such, FM 2008 and UL 1767 specify an RTI of about 36 m$^{1/2}$sec$^{1/2}$. By determining the time at which the trigger is activated in a heated flow stream at a predetermined temperature, the RTI of a specific heat responsive trigger can be determined by a standardized test apparatus developed by Factory Mutual Global as outlined in the Standard Documents.

The rapid response and larger flow orifices of these sprinklers were believed to be designed for suppression of fires in warehouses with 30 feet ceilings where flammable commodity is piled up to approximately 27 feet high in racks. Requirements for the installation and use of ESFR sprinklers are included in the Standards Documents. It is believed that the existing ESFR sprinklers for warehouses with the higher ceiling height are limited to a pendent configuration having the necessary ADD to suppress a fire of a given RDD at the ceiling height of 35 feet for upright ESFR sprinklers and 45 feet for pendant ESFR sprinklers. For example, the discharge coefficient (or "K" factor) of an existing pendent type ESFR—instead of an upright—sprinkler is nominally between 11-25, where the K-factor is calculated by dividing the flow of water in gallons per minute (GPM) through the sprinkler by the square root of the pressure of water supplied to the sprinkler in pounds per square inch gauge (i.e., GPM/$(psig)^{1/2}$). Upright type ESFR sprinklers are available; however, the K-factor of these ESFR upright sprinklers is limited to 14 or less and further require, among other things, that a minimum operating pressure of 50 pound-per-square inch gauge (psig) or greater be provided.

It is believed that the existing upright ESFR sprinklers do not provide, at low operating pressures, a sufficient quantity of water to produce early suppression of a fire in a commodity to protect warehouses with the higher ceiling height. However, it is believed that the existing ESFR upright sprinklers are unsatisfactory because, in order to achieve the necessary density, they require a minimum operating pressure of at least 50 psig for a ceiling height of 30 feet with storage height of approximately 27 feet and at least 75 psig for a ceiling height of 35 feet and storage height of approximately 32 feet.

SUMMARY OF THE INVENTION

The present invention provides fire suppression protection in storage enclosures. In one embodiment, a device with an unactuated heat responsive trigger assembly is provided so as to be oriental in a position to flow water towards a ceiling of the storage enclosure. The device can be configured to provide fluid flow upon actuation of the trigger so as to at least meet or exceed a required-delivered-density or to provide an appropriate density in extinguishing a fire or containing its growth.

In a preferred embodiment, the device can include an elongated member having a passageway opening extending along a longitudinal axis between an inlet and an outlet, the inlet having an inlet opening and an outlet with an outlet opening oriented at a ceiling of a building. The device includes a closure, an unactuated heat responsive trigger assembly coupled to the closure and a deflector assembly. The closure is releasably positioned proximate the outlet so as to occlude the passageway in a non-activated condition and to permit a flow of water towards the ceiling from the outlet in an activated condition.

In yet another preferred embodiment, the device includes an upright sprinkler that comprises a generally tubular body, at least one frame arm, a closure assembly, an unactuated heat responsive trigger assembly and a deflector assembly. The generally tubular body defines a passageway along a longitudinal axis, the passageway having a K factor of at least 16.8 where the K factor equals the flow of water in gallons per minute through the passageway divided by the square root of the pressure of water fed to the body in pounds per square inch gauge (GPM/$(psig)^{1/2}$). The tubular body also has an outer surface cincturing the passageway, the passageway having an inner surface spaced from the outer surface, an inlet opening at one end of the body and an outlet opening at another end with the passageway extending between the openings, the outer surface having pipe threads formed thereon. The at least one frame arm is formed as a unitary portion of the tubular body. The closure assembly is positioned proximate the outlet so as to occlude the passageway. The closure assembly has a cylindrical portion coupled to a plate portion and a cup shaped portion contiguous to the plate portion with a Bellville seal being disposed between the cylindrical portion and the plate portion. The closure assembly also includes an ejection spring having a spring body and two distal spring ends, the spring body engaging the cup shaped portion with the spring ends engaging a portion of the at least one frame arm. The heat responsive trigger assembly has a Response Time Index of less than 40 $meter^{1/2}second^{1/2}$ ($m^{1/2}sec^{1/2}$). The heat responsive assembly also includes a strut, a hook and a trigger. The strut has a first strut end engaging with the groove of the closure assembly and a second strut end coupled to a first notch of the hook being connected at a first hook end of the hook to a portion of the deflector assembly via a second notch. The hook is coupled to the trigger at a second hook end. The deflector assembly is coupled with the body through at least one frame arm so as to be spaced from and generally aligned with the outlet and the longitudinal axis. The deflector assembly also includes a nosepiece and an annular redirecting member. The nosepiece has deflecting surfaces symmetrical about a center of the nosepiece and facing the outlet and a plate member coupled to the at least one frame arm and spaced from the outlet opening. The plate shaped member includes a first generally planar portion, a conical second portion that extends in an oblique direction relative to the longitudinal axis, and a third portion extending from the conical second portion at a second angle relative to the longitudinal axis. The third portion includes a plurality of tines and a plurality of slots with at least one slot disposed between every two tines, so that, when the heat responsive trigger assembly is actuated and the closure is positioned to allow a flow of water, fed to the body at approximately 35 pounds per square inch gauge (35 psig) to issue from the outlet of the body towards a ceiling with a height of about 30 feet or less, or a flow of water fed to the body at approximately 52 pounds per square inch gauge (52 psig) to issue from the outlet of the body towards a ceiling with a height of about 35 feet or less, respectively, to be redirected to provide a density of fluid that suppress a fire in a storage situated beneath the ceiling.

In another preferred embodiment, the device includes an upright, early suppression, fast response sprinkler. The sprinkler comprises a body, at least one frame arm, a closure assembly, an unactuated heat responsive trigger assembly and a deflector assembly. The body defines a passageway along a longitudinal axis. The passageway has a K factor of at least 16.8 where the K factor equals the flow of fluid in gallons per minute through the passageway divided by the square root of the pressure of fluid fed to the body in pounds per square inch gauge (GPM/$(psig)^{1/2}$). The closure assembly is positioned proximate the outlet so as to occlude the passageway. The heat responsive trigger assembly has a Response Time Index of less than 40 $meter^{1/2}second^{1/2}$. The deflector assembly is coupled with the body through the at least one frame arm so as to be spaced from and generally aligned with the passageway and the longitudinal axis so that, when the heat responsive trigger assembly is actuated and the closure is positioned to allow a flow of fluid, to issue from the passageway of the body in a first direction towards a ceiling, the flow of fluid is redirected to a plurality of first flow paths, a plurality of second flow paths, and a plurality of third flow paths that suppresses a fire in a commodity situated beneath the ceiling. The plurality of first flow paths is disposed at periodic intervals of approximately 90 degrees about the longitudinal axis. The first flow paths distribute fluid over a first distance from the longitudinal axis. The second flow paths distribute fluid over a second distance less than the first distance. And the third flow paths distribute fluid over an area between the first flow paths and the second flow paths.

In a further preferred embodiment, the device includes an upright, early suppression, fast response sprinkler. The sprinkler comprises a body, at least one frame arm, a closure assembly, an unactuated heat responsive trigger assembly and a deflector assembly. The body defines a passageway along a longitudinal axis. The passageway has a K factor greater than 14 where the K factor equals the flow of fluid in gallons per minute through the passageway divided by the square root of the pressure of fluid fed to the body in pounds per square inch gauge (GPM/(psig)$^{1/2}$). The closure assembly is positioned proximate the outlet so as to occlude the passageway. The heat responsive trigger assembly has a Response Time Index of less than 40 meter$^{1/2}$second$^{1/2}$. The deflector assembly is coupled with the body through the at least one frame arm so as to be spaced from and generally aligned with the outlet and the longitudinal axis so that, when the heat responsive trigger assembly is actuated and the closure is positioned to allow a flow of fluid, fed to the body at a predetermined pressure, to issue from the outlet of the body in a first direction towards a ceiling, the flow of fluid being redirected to a second direction opposite the first to provide a density of fluid that suppresses a fire in a storage situated beneath the ceiling.

In another preferred embodiment, the device includes an upright, early suppression, fast response sprinkler. The sprinkler comprises a body, at least one frame arm, a closure assembly, an unactuated heat responsive trigger assembly and means for redirecting fluid flow from the body. The body defines a passageway along a longitudinal axis. The passageway has a minimum diameter of at least approximately 0.77 inches. The at least one frame arm is coupled to the body. The closure assembly is positioned proximate the outlet so as to occlude the passageway. The heat responsive trigger assembly has a Response Time Index of less than 40 meter$^{1/2}$second$^{1/2}$ (m$^{1/2}$sec$^{1/2}$). The means for redirecting redirect a flow of fluid from the passageway toward storage materials at an actual delivered density of fluid greater than a required density so as to suppress a fire beneath a ceiling.

In a further preferred embodiment, a fast response fire suppression system is provided to suppress fire of an enclosure having a floor and a ceiling between 30 and 35 feet from the floor and storage material stored in the enclosure up to a storage height of approximately 27 to 32 feet from the floor, respectively. The system includes a source of fluid, a network of piping and at least one device, which can be an upright, early suppression, fast response sprinkler being coupled to the network of piping. The network of piping is in fluid communication with the fluid supply with each pipe of the network having a plurality of sprinkler fittings. The upright sprinkler being coupled to one of the plurality of fittings and includes a body and a deflector assembly. The body has an inlet, an outlet and a passage way extending along a longitudinal axis between the inlet and the outlet, the inlet and outlet each having an opening, and a K factor greater than 14 where the K factor equals the flow of fluid in gallons per minute through the passageway divided by the square root of the pressure of fluid being fed to the body in pounds per square inch gauge (GPM/(psig)$^{1/2}$). The deflector assembly is coupled with the body so as to be spaced from and generally aligned with the outlet and the longitudinal axis so that a flow of water issuing from the outlet and deflected by the deflector assembly is at a density greater than a density necessary to suppress a fire.

The present invention also provides for several methods that relate to fire suppression. One of the methods includes a method of forming an early suppression, fast response upright sprinkler. This method is achieved in part, by defining a body with a passageway having an inlet and an outlet extending along a longitudinal axis between the inlet and the outlet; locating a deflector assembly at a distance from an outlet of the passageway of at least approximately 2.1 inches from the outlet; mounting a closure assembly in the opening of the outlet; and coupling a unactuated heat responsive trigger assembly to the closure assembly. Each of the inlet and outlet has an opening in the body. The body has a K factor greater than 14 where the K factor equals the flow of fluid in gallons per minute through the passageway divided by the square root of the pressure of fluid being fed to the body in pounds per square inch gauge (GPM/psig)$^{1/2}$).

In yet another preferred embodiment, a method of suppressing a fire is provided. The method can be achieved, in part, by locating a sprinkler above at least one storage arrangement, so that a direction of fluid flow through a body of the sprinkler is towards a ceiling having a height of 35 feet or less; and flowing fluid pressurized at approximately 50 pounds per square inch gauge (psig) at a deflecting structure of a sprinkler to deliver an actual density of fluid greater than a required delivered density of at least one commodity selected from the following group of commodities: encapsulated or unencapsulated commodities, cartoned unexpanded plastic commodities, heavy weight roll paper, plastic coated heavy weight roll paper, medium weight roll paper, rubber tires mounted on one side or on tread and non-interlaced, and cartoned expanded plastic commodities so that a fire in the at least one storage arrangement containing the at least one commodity is suppressed.

In yet a further preferred embodiment, a method of distributing fluid over a fire protection area, the method can be achieved, in part, by flowing fluid at approximately 50 pounds per square inch gauge (psig) toward a ceiling from an outlet opening along a longitudinal axis of at least one upright sprinkler upon actuation of the upright sprinkler, the sprinkler having a K factor greater than 14 and being positioned above an area to be protected such that the longitudinal axis is positioned at distance (X or Y) from the boundary of the area; and distributing along at least a first flow path a sufficient amount of fluid to suppress a fire over a distance approximately equal to 1.4 times the distance (X or Y) from the longitudinal axis.

BRIEF DESCRIPTION OF THE DRAWINGS

The accompanying drawings, which are incorporated herein and constitute part of this specification, illustrate a preferred embodiment of the invention, and, together with the general description given above and the detailed description given below, serve to explain the features of the invention.

DETAILED DESCRIPTION OF THE PREFERRED EMBODIMENTS

Figure 1:
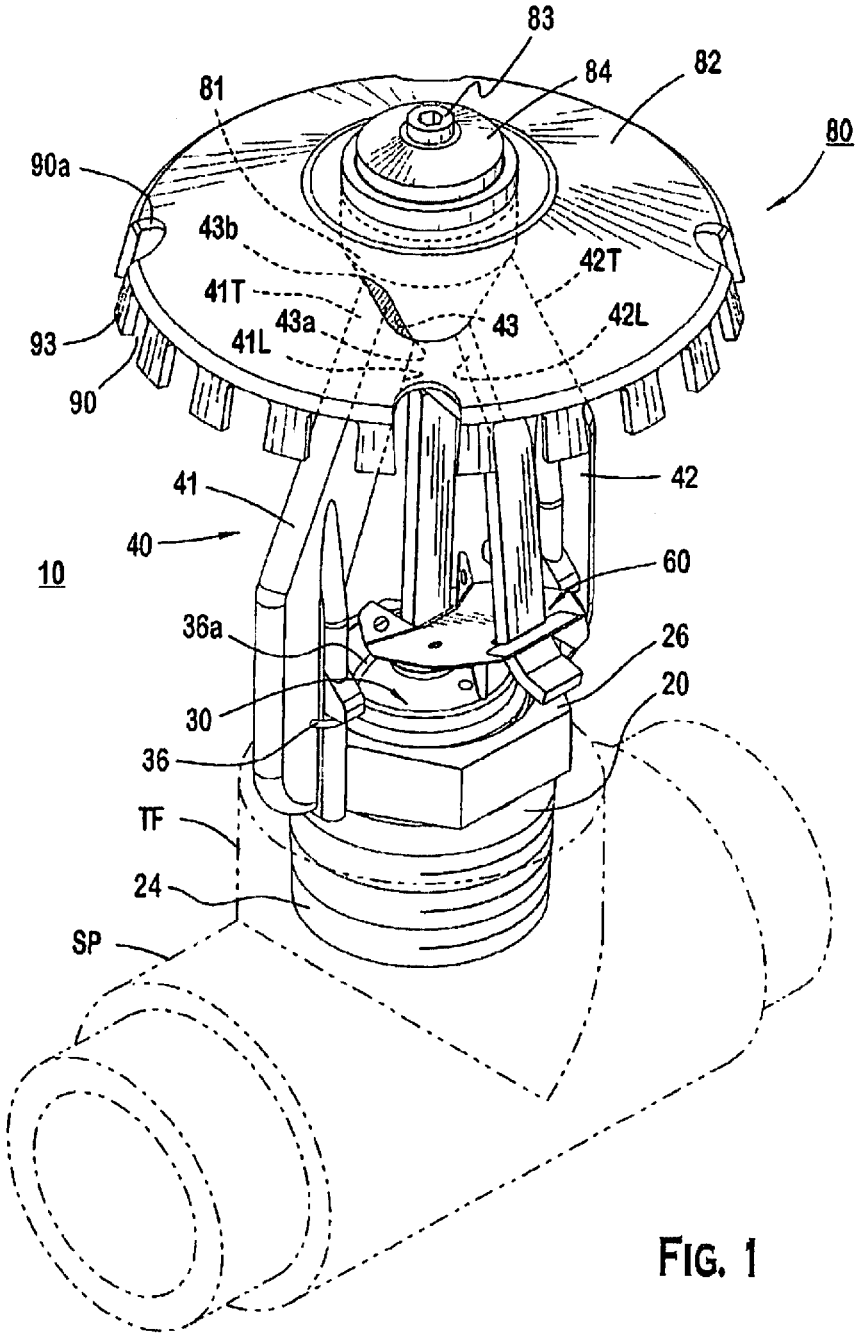
FIG. 1 depicts an ESFR upright sprinkler according to a preferred embodiment.

Referring to FIGS. 1-4, an early suppression, fast response ("ESFR") upright sprinkler 10 is shown. The ESFR upright sprinkler 10 includes a generally tubular body 20 extending along a longitudinal axis A-A, a closure assembly 30, a frame 40, a trigger assembly 60, and a deflector assembly 80.

The generally tubular body 20 has an outer body surface 20a and an inner body surface 20b spaced from the outer body surface 20a (FIG. 2), an inlet opening 21 and an outlet opening 22 with a passageway 23 extending between the openings. Although the generally tubular body 20, inlet opening 21 and outlet opening 22 are preferably shown as circular in cross-section, it is noted that other suitable cross-sectional shape transverse to the longitudinal axis, such as, for example, circular, oval, square or polygonal can be used for each of the generally tubular body 20 and openings. The generally tubular body 20 may have an axial length of about one inch to about one and one-third inches. However, the generally tubular body 20 can have a longer than a preferred length of 1.2 inches so as to permit the generally tubular body 20 to be positioned further from a network of fluid delivery pipes SP. To facilitate mounting to a sprinkler fitting, external pipe thread 24 can be provided on the outer surface of the generally tubular body 20. Alternatively, rather than a direct connection, the generally tubular body 20 can be mounted to one or more intermediate member(s), which can extend the length of the generally tubular body 20 from the network of pipes SP or sprinkler fittings. Preferably, the generally tubular body 20 is an elongated tube having an axial length of approximately 1.2 inches. As used herein, the term "approximately," "generally," or "about" indicates that a stated value of a structure can include a range of tolerance sufficient for its intended use.

The passageway 23 can be of a constant cross-section (not shown) or changing cross-sections along the longitudinal axis A-A between the inlet opening 21 and the outlet opening 22. The passageway 23 may have a length of approximately 0.8 inches to approximately 1.2 inches. At the inlet opening 21, the internal surface 23a of the passageway 23 can have a surface 25 approximating a bell mouth portion so as to reduce frictional losses of a fluid entering the inlet opening 21. The cross-section of the passageway 23 and the passageway portion 23a past the bell mouth surface 25 can be greater than a cross-section of the passageway portion 23c proximate the outlet opening 22. Preferably, the passageway 23 between the bell mouth portion 25 and portion 23c approximates a general cone having a taper a between the inlet and outlet of between approximately $\alpha$=2 degrees to approximately $\alpha$=10 degrees as measured with respect to the longitudinal axis A-A.

Near the outlet opening 22, the passageway 23 has a first stepped portion 23d, a boss portion 23e so as to provide a seating surface for a closure assembly 30, a second stepped or beveled portion 23f and a reversed tapered portion 23g. The passageway portion 23 can have a length of approximately 0.7 inches to approximately 1.3 inches with a changing cross-sectional area between the inlet and the outlet. The passageway portion 23c proximate the outlet 22 can have a minimum diameter of at least 0.74 inches and an axial length along the longitudinal axis of approximately one-sixteenth to approximately one-quarter inch. The portions 23e and 23f can have a respective axial length of approximately 0.02 to approximately 0.08 inches and approximately 0.02 to approximately 0.09 inches. The second stepped portion 23f can be canted at an angle of between approximately 20 degrees to approximately 60 degrees relative to the longitudinal axis A-A. Preferably, the passageway portion 23c changes over to a first stepped portion 23d which extends for a predetermined axial distance before extending in a radial direction so as to form the portion 23e, which provides, in cooperation with a closure assembly, a sealing or seating surface. The beveled portion 23f preferably terminates in a reversed taper portion 23g of between 2 to 10 degrees with respect to a plane transverse to the longitudinal axis A-A.

The passageway 23, inlet 21 and outlet 22 can be sized and configured such that a discharge coefficient of the passageway 23 or its K-factor is greater than 14, and the passageway 23 may have a minimum diameter greater than approximately 0.70 inches. As used here, the discharge coefficient or K factor is quantified as a flow of water through the passageway 23 in gallons per minute (GPM) divided by the square root of the pressure of water fed into the generally tubular body 20 in pounds per square inch gauge ($GPM/(psig)^{1/2}$). Discharge coefficients or K factors can be "nominal" values. The nominal values applicable to the preferred embodiments include 16.8, 19.6, 22.4, 25.2, 28.0, 33.6, and 39.2. These values encompass the stated number and plus or minus five percent (±5%). Thus, a nominal K factor of 16.8 encompasses all measured K factors between 16.0 and 17.6.

The discharge coefficient relates in part to the shape of the generally tubular body or the inner diameter of the passageway 23, which, for example, preferably has a minimum diameter of at least approximately 0.77 inches. It is noted that other parameters including flow area and length of the passageway 23 contribute to the K-factor, and that the inner diameter of the passageway can be of a suitably large value as long as the sprinkler can function for its intended purpose as an upright ESFR sprinkler. In one preferred embodiment, the K-factor is nominally 16.8.

The frame 40 can be coupled to the generally tubular body 20 proximate the outlet opening 22. The frame 40 can also be formed as a unitary member with the generally tubular body 20, which in the preferred embodiment the generally tubular body 20 and frame 40 can be configured as a hexagonally shaped, circumferential flange 26 with opposite flat surfaces 26a and 26b shown in FIG. 2. The flat surfaces 26a and 26b are configured for mating engagement with a suitable tool for threading and tightening the upright sprinkler 10 into a threaded fitting TF so as to permit fluid communication with a supply pipe SP. A saddle member 84 couples a redirecting member 82 to a nosepiece 81. The flange 26 preferably forms at least one arm 41 of the frame 40, and preferably two arms 41 and 42, which can be diametrically spaced apart between the longitudinal axis A-A proximate the flange 26 and converging towards one another at an acute angle relative with an intermediate boss member therebetween so as to generally form an arch with the nosepiece 81 therebetween. The generally tubular body 20, the unitary frame arms 41, 42 and the nosepiece 81 can be made from rough or fine casting and machined to desired features and dimensions. It should be noted that although one or two frame arms can be used with the sprinkler described herein, more than two frame arms can be used as long as the actual number of frame arms permits the sprinkler to function for its intended purpose as an upright ESFR sprinkler.

With reference to FIGS. 1-4, the deflector assembly 80 includes the nosepiece 81, redirecting member 82, retainer/compression member 83 and saddle 84. The deflector assembly 80 provides means for redirecting fluid, such as, for example, water, flowing from the outlet opening towards a ceiling in a generally opposite direction so as to suppress a fire in a storage building. The means for redirecting, while preferably is provided by the deflector structure 80, can be any suitable arrangement of components that redirects the flow of fluid from the outlet of the sprinkler in a suitable manner to suppress a fire. As used herein, the term "suppress" and its variations is indicative of a value of a delivered water density sufficient to contain or extinguish a fire. That is, one manner of quantifying the term "suppress" so as to permit repeatable results under controlled conditions is by having an ADD greater than the RDD of a particular commodity. The particular commodity may be stacked on itself, on storage racks, or combinations thereof at a height of SH in a warehouse having ceiling height H. In particular, the quantification of the term "suppress" or "suppression" can be performed through the use of an apparatus developed by FM Global ("an ADD apparatus") and as outlined in the Standards Documents.

The nosepiece 81 of the deflector assembly 80 can be coupled to the frame 40 or formed as a unitary part of the frame 40. The nosepiece 81, being part of the deflector assembly 80, has a base portion 81a secured to a face portion or major deflecting surface portion 81b. As used herein, the term "secured" means that the two portions can be releasably connected to each other. However, during use or while installed in a sprinkler system, the two portions are preferably fixed relative to each other. The base portion 81 a includes a generally flat planar surface 81c extending along the longitudinal axis to form cylindrical surface 81d. The face or major deflecting surface portion 81b is oriented to face the outlet such that its surface is impacted by fluid flowing through the outlet opening. The face or major deflecting surface portion 81b includes oblique surface 81e and frontal surface 81f. The oblique surface 81e is preferably joined to the frontal surface 81f by a radiused fillet. The base portion 81a and face portion 81b are, preferably, symmetrical about the longitudinal axis. The oblique surface 81e can be a truncated right circular cone (i.e., a frustum) with a conical angle of between 15 degrees to 35 degrees, and preferably a frustum with a conical angle of approximately 25 degrees relative to the longitudinal axis.

It is preferable that the fluid flowing from the outlet opening 22 be intercepted by the major deflecting surface 81b so that there can be sufficient coverage by the fluid spray distribution pattern. The nosepiece 81 can be configured so that at least one frame arm is positioned to substantially intercept a fluid stream profile represented by an imaginary cylinder (not shown) projecting from the outlet opening 22 along the longitudinal axis A-A. Furthermore, the cross-section of each frame arm in the fluid intercept region can be slender (i.e., the length being greater than the thickness at a specified location). In other words, the length of this cross-section, measured perpendicular to the leading edge 41L or 42L (i.e., the edge closest to the longitudinal axis) of the frame arm, can be approximately two or more times the maximum thickness of the frame arm, with the surfaces of each frame arm being shaped to guide the fluid intercepted by that frame arm to flow into the region immediately downstream of its trailing edge. Proximate the fluid intercept region, the frame arm cross-section can be of a generally streamlined shape 43 with narrow or tapered leading 43a and trailing portions 43a (FIG. 1). Preferably, the cross-section of the frame arm in the fluid intercept region is of ellipsoidal shape; and the leading edges of the frame arms in the fluid intercept region are substantially straight. Also preferably, the angle of a leading edge 41L or 42L of the respective frame arms is approximately 20 degrees relative to the longitudinal axis whereas the angle of a trailing edge 41T or 42T of the respective frame arms is approximately 25 degrees relative to the longitudinal axis.

The base portion of the nosepiece 81 can be provided with a planar surface 81c and a lip 81g. The saddle 84 can be formed by a suitable technique, such as, for example, castings, stampings, deep drawing or a combination of casting, stamping, deep drawing or machining. Provided generally through a center of the nosepiece 81 is an internally threaded passageway 81h, to which a retainer/compression member 83 can be coupled thereto. The saddle 84 can be coupled, or preferably threaded, by the retainer/compression member 83 to the internally threaded passage 81h so as to clamp the redirecting member 82 to the nosepiece 81. The retainer/compression member 83 can also be formed by a suitable technique, such as, for example, castings, stampings, deep drawing or a combination of casting, stamping, deep drawing or machining and provided with external threads 24. Advantageously, the retaining member 83 not only retains the redirecting annular member, it also operates to provide a mounting point for the unactuated heat responsive trigger assembly 60. However, the retaining member 83 may not be needed in retaining the saddle 84 where the annular redirecting member 82 is of unitary construction with the nosepiece 81. Other suitable configurations to retain the heat responsive assembly to the nose piece without a threaded screw can also be used such as, for example, a spring-loaded pin in a blind center bore of the nosepiece 81 or a flexible strut 61 member of the heat responsive assembly being coupled to an apex of the nose piece rather than a pin or screw. Preferably, the retainer/compression member 83 is a compression screw having external screw threads formed over a substantial length of the screw with a nose 83a at one end and a blind bore 83b configured to receive a tool, such as, for example, a hexagonal key tool.

The redirecting member 82 includes a generally plate member 82a spaced for a distance "$L_1$" along the longitudinal axis from the outlet opening 22. The redirecting member 82 can be formed by a suitable technique, such as, for example, castings, stampings, deep drawing or a combination of casting, stamping, deep drawing or machining. As noted earlier, the redirecting plate member 82a can be configured as a separate member coupled to the generally tubular body 20 or as a unitary portion of the frame 40 or the generally tubular body 20. Regardless of the configurations, the redirecting plate member 82a is important in re-directing the flow of water from the outlet opening 22 during activation of the sprinkler 10 so as to achieve a suitable Actual-Delivered-Density (ADD) that exceeds a Required-Delivered Density (RDD) of a specified storage enclosure, which RDD is dependent on the type of storage being stored at a height SH in the storage enclosure having a ceiling height of H. For example, in FIG. 4, the RDD for palletized and solid pile storage (classifiable under FM Global classification system as Class I-IV and Group A unexpanded plastics without open top containers and no solid shelves) at a storage height SH and ceiling height H is different for the RDD of rubber tires stored on their side walls 122 or on treads 124 (on palletized, portable/fixed racks 136 with solid shelves or laced in portable steel racks 130 without solid shelves) at the same or different SH and H, which RDD is also different from the RDD of rolled paper 116, 118, 120 (which can be medium weight, uncoated or plastic coaled heavyweight paper, respectively) at the same or different SH and H, which RDD is also different from the RDD of stored idle wood or plastic pallets 119, at the same or different respective SH and H. The deflector assembly 80, as configured with the generally tubular body 20, closure assembly 30, and frame 40 to form an upright fast response sprinkler 10 (in conjunction with a suitable hydraulic system) in this disclosure can achieve an ADD that exceeds any one of the RDDs discussed above. Preferably, the redirecting member is at least three feet (3 feet) above the storage height SH.

Figure 2:
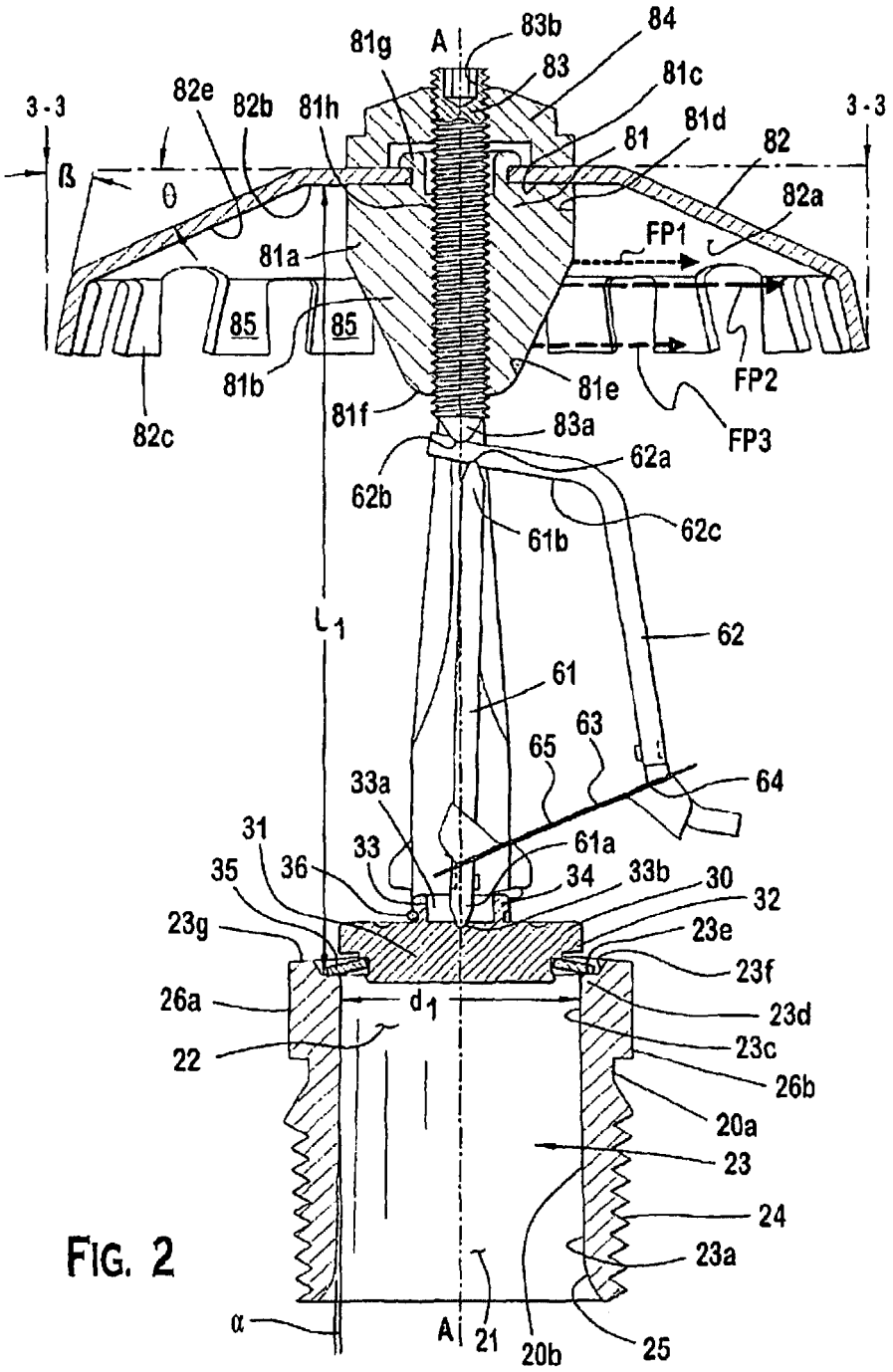
FIG. 2 is a cross-section side view of the ESFR upright sprinkler of FIG. 1.

Referring to FIG. 2, the redirecting plate member 82a can be seen as including three portions. A first redirecting portion 82b can be a generally planar surface portion nearest the longitudinal axis A-A with an aperture 82d (FIG. 3) of a suitable dimension so as to permit the plate member 82 to be inserted over a raised portion of the nosepiece 81 and secured by lip 81g that is formed after plate member 82 is positioned over planar surface 81c. In a preferred embodiment, the first redirecting portion 82b can be located at a distance "$L_1$" of at least 2.1 inches from the seating surface 23e of the outlet opening 22. A second redirecting portion 82e can be a conic portion that extends in an oblique direction relative to the longitudinal axis A-A. The second redirecting portion 82e extends at an acute angle θ with respect to a virtual planar extension of the first redirecting portion 82b. The acute angle θ can be between approximately 10 degrees to approximately 40 degrees. Preferably, the distance $L_1$ is approximately 2.55 inches while the acute angle θ of the second redirecting portion 82e can be between approximately 15 degrees and approximately 35 degrees. In a preferred embodiment, the acute angle θ is approximately 24.5 degrees.

A third redirecting portion 82c extends from the second redirecting portion 82e at an angle β with respect to longitudinal axis A-A. Preferably, the angle β of the third redirecting portion 82c can be between 7 degrees and 17 degrees and more preferably between approximately 10 degrees and approximately 14 degrees. In one preferred embodiment, the angle β is approximately 12 degrees.

Figure 3:
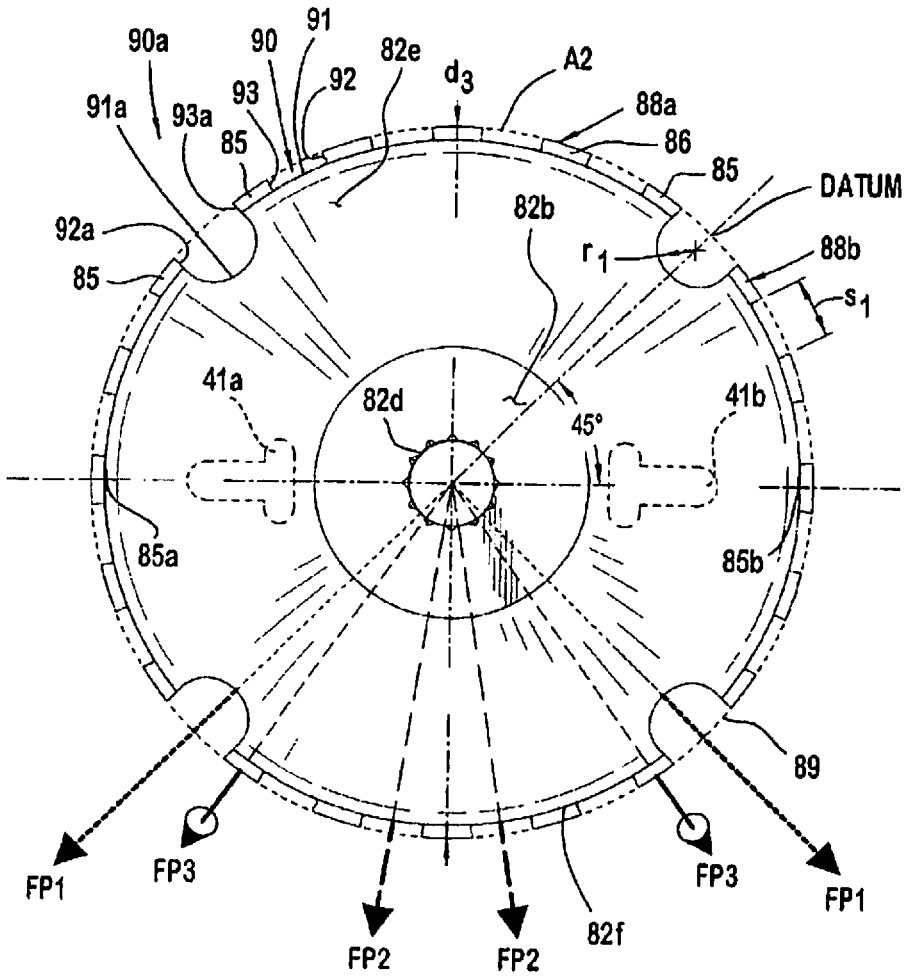
FIG. 3 is a depiction of the annular fluid-redirecting member as seen through view 3-3.

The third redirecting portion 82c can include a plurality of tooth-like portions or tines 85, shown here in FIGS. 2 and 3. Linear edge slots 90 can be disposed between every two tines 86 with curved edge slot 90a that can be disposed at periodic intervals about the longitudinal axis between tines 85. Referring to FIG. 3, each slot 90 has a circumferential edge 91 co-terminus with a perimeter 82f of the second redirecting portion 82e and two side edges 92 and 93 extending radially from the longitudinal axis A-A. Each of the slots 90 can have different configuration depending on its location relative to the plurality of arms 41 and 42 of the frame 40. For example, a "scallop" slot 90a can have a curved edge 91 a proximate a circumferential edge 82f of the conical second redirecting portion 82e connecting two obliquely (relative to the longitudinal axis) extending edges 92a and 93a of two adjacent tines 85, and a "normal" slot 90 can have a generally linear edge 91 co-terminus or contiguous with the perimeter 82f of the conical second redirecting portion 82e connecting two obliquely (relative to the longitudinal axis) extending edges 92 and 93 of two adjacent tines 85. The curved edge 91a can be defined by a radius r of approximately 0.138 inch with a datum for the center of the radius $r_1$ located by an imaginary radial line from the longitudinal axis bisecting the slot 90 (i.e., the center is approximately mid-way between the two side edges 92a and 93a of the adjacent tines 85). The imaginary radial line is located approximately 45 degrees with respect to a pair of perpendicular lines extending through the longitudinal axis.

At least two types of tines can be formed by a suitable technique, such as, for example, castings, stampings, deep drawing or a combination of casting, stamping, deep drawing or machining. A first type includes a tine 86 having each of its edges co-terminus to the normal slot 90. A second type includes a tine 85 having one of its edges co-terminus to the scallop slot 90. The tine 86 has an arcuate peripheral edge 88a of a predetermined arcuate length while the tine 85 has an arcuate peripheral edge 88b of the same or different arcuate length. Between every three tines 86 of the first type, there can be two tines 85 of the second type. However, it should be understood that there can be different permutations of the number of the first type of tines 86 to the number of the second type of tines 85. Preferably, there are 12 tines of the first type and 8 of the second type. Preferably, there is at least one scallop edge slot for every four linear edge slots. More preferably, there are between 16 and 24 tines of both types of tines and at least four scallop slots 90a placed about the longitudinal axis A-A such that at least two scallop slot 90a are radially spaced at approximately 90 degrees to each other as referenced from the longitudinal axis A-A, and at least one scallop slot 90a is radially spaced at approximately 45 degrees about the longitudinal axis from one of the supporting arms 41 and 42. It should be noted that at least four scallop slots can be disposed about the longitudinal axis such that any one of the at least four scallop slots is disposed at a 45 degree angle from at least one of the arms about the longitudinal axis. Also preferably, the radial side edges of either the normal slot 90 or the scallop slot 90a can be spaced apart at a distance $S_1$ of approximately 0.19 inches proximate the perimeter 82f of the second redirecting portion 82e to about 0.21 inches at the perimeter 89 of the tines, and the respective centers 85a and 85b of at least two diametrically opposing tines 85 are on an axis passing through frame arm center 41a and 42a.

The combination of different tines and different slots allows a flow of fluid, which is preferably water, issuing from the outlet opening 22 towards a ceiling having a height of approximately 18-35 feet from a floor to be redirected so as to provide an actual delivered density (GPM/$ft^2$) of fluid sufficient to prevent the spreading of a fire in the storage and in many cases, extinguishing such a fire. The flow of water from the outlet is redirected into a first plurality, a second plurality of flow paths, and a third plurality of flow paths FP1, FP2, and FP3, respectively. And each flow paths FP1, FP2, or FP3, has a different density such that the combination of flow paths provides a combined density of distributed fluid sufficient to to suppress a fire. In particular, the first flow paths FP1 are oriented in periodic intervals of various values between 60-120 degrees about the longitudinal axis whereas the second flow paths are oriented at periodic intervals about the longitudinal axis. For clarity, only two of each of the first flow paths FP1, second flow paths FP2, and third flow paths FP3 are illustrated in FIG. 3. It should be noted here that the periodic interval between each of the first flow paths need not be a regular interval but can be of varying intervals. For example, two adjacent firstflow paths FP1 can have a separation of 60 degrees and a separation of 120 degrees with another adjacent flow path. Preferably, the separation angle between the first flow paths is at a regular interval of approximately 90 degrees.

Figure 4:
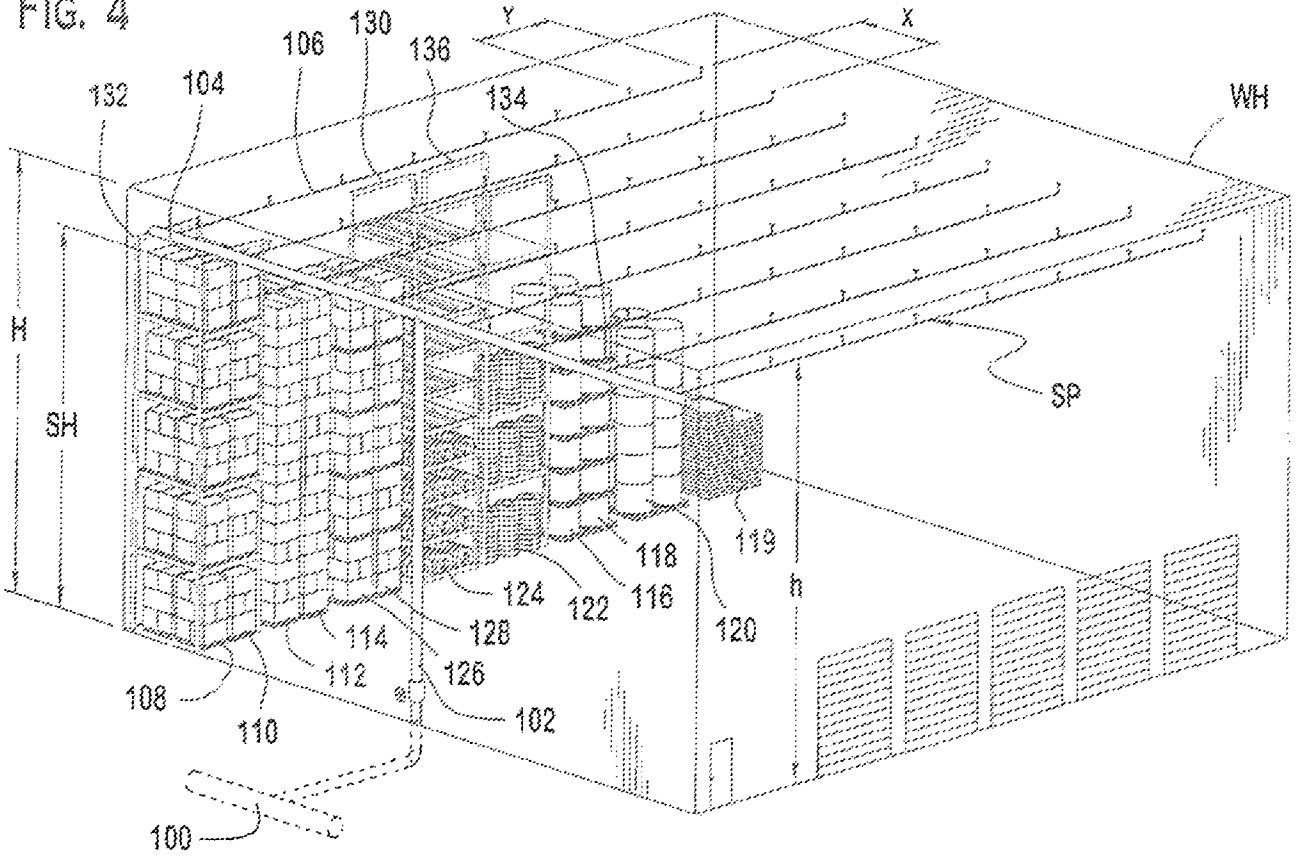
FIG. 4 depicts a warehouse with a fire protection system using the upright sprinklers of the preferred embodiment.

Each of the first flow paths FP1 permits the fluid to be distributed further with respect to the second flow paths FP2 so that each of the first flow paths FP1 extend toward respective corners of a polygon. That is, each of the first flow paths FP1 extends outwardly, in a preferred embodiment, toward each respective corner of a four-sided polygon that defines a protected area, and at least one of the second flow paths FP2 is oriented at approximately between 20 to 60 degrees from one of the first flow paths FP1 so as to distribute fluid over a distance X or Y from the longitudinal axis A-A of the upright sprinkler (FIG. 4). Furthermore, the third flow paths FP3 encompass an area between the first flow paths FP1 and the second flow paths FP2 so as to provide sufficient coverage of the area to be protected. The third flow paths FP3 distribute fluid over an area directly beneath the sprinkler to areas wetted by fluid distributed by the first and second flow paths FP1, FP2. Preferably, the four sided polygon is a square so that an included angle between flow paths FP1 and FP2 is approximately 45 degrees and the distance covered by the first flow path is approximately 1.4*X.

As illustrated in FIG. 2, the scallop edge slot allows the flow of fluid to be distributed in a first plurality of flow paths FP1 commencing from the longitudinal axis and extending in a generally transverse direction thereto at a first longitudinal distance front the outlet opening. The normal or linear edge slots allow the flow of fluid to be distributed in a pattern in a generally second plurality of flow paths FP2 extending in a transverse direction from the longitudinal axis at a second longitudinal distance less than the first longitudinal distance as referenced to the outlet opening. In a preferred embodiment, each of the first flow paths FP1 is distributed at an orientation of approximately 90 degrees with respect to adjacent first flow paths FP1 so that each of the first flow paths FP1 extends over a distance of approximately 170 inches toward respective corners of a square of approximately 120 inches or ten feet in length per side, and at least one of the second flow paths FP2 extends over a distance X of approximately 120 incites, which second flow path FP2 is oriented at approximately 45 degrees with respect to one of the first flow paths FP1.

Referring to a top view of the redirecting plate member 82a in FIG. 3, the outer perimeter 89 of the peripheral edges 88a, 88b of the tines 86 and 85 creates a cross-sectional area A2 (with diameter $d_3$ such that $A2=(0.5*d_3)^2*\pi$) of the plate member 82a such that area A2 can be at least 8 times an area A1 of the minimum cross-sectional area of the passageway 23 proximate the outlet opening 22 [$A1=(0.5*d_1)^2*\pi$]. In particular, the ratio A2/A1 of the cross-sectional area A2 of the plate member 82a to the minimum cross-sectional area A1 of the passageway 23 is at least 8. Preferably, where the plate member 82a and the outlet opening 22 employ a circular configuration, a ratio $d_3/d_1$ of the diameter $d_3$ of the redirecting plate member 82a cross-sectional area to the minimum diameter $d_1$ of the passageway 23 is at least 2.8

Mounted in the outlet opening 22 is a closure assembly 30 having an outer surface that can form a seal with a sealing or seating surface of the outlet opening 22. Referencing FIGS. I and 2, the closure assembly 30 has a cylindrical closure portion 31 coupled to a stepped plate portion 32 and a cup shaped portion 33. The cup shaped portion 33 has a blind bore 33a with a groove 33b disposed proximate a bottom surface of the blind bore 33a, and a circumferential lip 34 disposed proximate an opening of the blind bore 33a. In a preferred embodiment, the closure assembly 30 has a sealing portion of a Belleville seal 35 being disposed between the cylindrical closure portion 31 and the plate portion 32. The closure assembly 30 can also be formed by a suitable technique, such as, for example, castings, stampings, deep drawing or a combination of casting, stamping, deep drawing or machining. Preferably, the Belleville seal 35 is limed of Beryllium-nickel with a Teflon® seal.

To assist in the ejection of the closure assembly 30 away from the outlet opening 22 during actuation of the upright sprinkler 10, an ejection spring 36 shaped like an archery bow can be provided. The center of the bow-like ejection spring 36 preferably engages a portion of the cup-shaped portion and is retained by the lip 34 proximate a central portion 36a of the ejection spring 36 while the spring ends 36b and 36c engage portions of the frame arms 41 and 42 respectively. Alternatively, the ejection spring 36 can engage any part of the unactuated heat responsive trigger assembly, such as, for example, the strut or the hook. The ejection spring 36 can be formed by a suitable spring forming technique, tempered to a predetermined tensile strength from a spring alloy material, and is preferably formed from Inconel® 600 spring steel alloy.

A preferred embodiment of a heat responsive trigger assembly 60—shown here in FIGS. 1 and 2—in a unactuated mode, has a strut 61 with a first end 61a inserted into the blind bore 33a so as to engage with the groove 33b of the closure assembly 30 with and a second end 61b coupled to a hook 62 at a first notch 62a of the hook 62. The hook 62 can be fixedly connected at one end to a generally conical end 83a of retaining member 83 via a second notch 62b. The hook 62 is coupled to an unactuated heat responsive trigger 63 at the other end. The hook 62 and strut 61 provide a mechanical advantage to the trigger 63 so as to reduce the amount of loading imposed on the trigger 63. That is, the nose 83a acts as a fulcrum at the second notch 62b so that a force on the trigger 63, and hence the retention of closure assembly 30 against fluid pressure in the passage 23 is magnified by a lever arm through arm portion 62c of the hook 62. The strut 61 and hook 62 can also be formed by a suitable technique, such as, for example, castings, stampings, deep drawing or a combination of casting, stamping, deep drawing or machining. The heat responsive trigger assembly 60 can also employ other trigger arrangements with suitable corresponding trigger assembly structures to accommodate these trigger arrangements.

The unactuated heat responsive trigger 63 includes two metallic links 64 and 65 joined face to face by a thin layer of fusible material. The fusible material can be calibrated to change from a solid state to a liquid state as a function of a fixed temperature or a range of temperatures. Preferably, the temperature at which the trigger assembly 60 actuates the sprinkler 10 can be either approximately 165 degrees or approximately 214 degrees Fahrenheit. Additional details of a similar heat responsive trigger are provided in U.S. Pat. No. 4,893,679, which is hereby incorporated by reference in its entirety.

The Response Time Index (RTI) of the trigger assembly 60 can be less than approximately 100 $meter^{1/2}second^{1/2}$ ($m^{1/2}sec^{1/2}$). Preferably, the RTI can be less than approximately 50 $meter^{1/2}$ $second^{1/2}$ ($m^{1/2}sec^{1/2}$) and more preferably less than approximately 35 $m^{1/2}sec^{1/2}$. It is noted that the heat responsive trigger assembly 60 could include a fixed temperature trigger or a gradient type trigger. In a preferred embodiment, the RTI is approximately 23 $m^{1/2}sec^{1/2}$ as measured with a standardized plunge test apparatus made by FM Global.

The upright sprinkler 10 can be formed as follows. The generally tubular body 20 is provided with a frame 40 and nosepiece 81 preferably formed as a unitary part. The outlet opening 22 has a frame 40 with a plurality of arms extending along the axis A-A and joining together at their apex by a nosepiece 81. The retaining member 83 is threaded in the internally threaded opening 81g of the nosepiece 81. The lip 81g is formed around the redirecting member 82. Lip 81g retains the redirecting member 82 to the nosepiece 81. The saddle 84 is then threaded onto the retaining member 83 to provide a backup for lip 81g and a retainer to support the redirecting member 82 between the nosepiece 81 and the saddle 84. The redirecting member 82 is then mounted to the annular boss portion 81a of the nosepiece 81 so as to be located at a distance of at least 2.1 inches front the outlet opening 22. The Belleville seal 35 can be mounted to the closure stepped portion 32 of the closure assembly 30. The closure assembly 30 is then mounted to the outlet opening 22 with a central portion 36a of the bow-shaped ejection spring 36 engaging the cup-shaped portion 33 of the closure assembly 30 while distal terminal spring ends are coupled respectively to the frame arms 41 and 42. One end 61 a of the strut 61 can be coupled to the closure assembly 30 via groove 33b formed at the base of the blind bore 33a of the closure assembly 30. The other end 61b cats be aligned along the longitudinal axis A-A so as to be coupled with a notch 62a of the hook 62. The retaining member 83 is then threaded towards the outlet opening 22 so as to cause the nose 83a of the retaining member 83 to engage with the notch 62b of the hook 62. By threading the retaining member 83 to a specified torque, the unactuated heat responsive trigger assembly 60 and the closure assembly 30 are preloaded so as to provide a compressive force along the longitudinal axis. The unactuated heat responsive trigger assembly 60 and the closure assembly 30 are then further preloaded so as to cause a specified deflection in the closure assembly 30 with respect to a specified datum so as to complete the assembly of the upright sprinkler 10. Once the upright sprinkler 10 is assembled, the sprinkler 10 can be mated to a threaded fitting TF of a branch line of a fire suppression system, which is preferably installed in accordance with the aforementioned and incorporated by reference Standards Documents.

It is believed that one of many advantages of a preferred embodiment is the ability to deliver the required average ADDs of, briefly, 0.55 gal/min/ft$^2$ to 0.65 gal/min/ft$^2$ of a minimum of 20-pan for one sprinkler 10 centered over an ADD apparatus developed by FM Global; 0.55 gal/min/ft$^2$ to 0.69 gal/min/ft$^2$ of a minimum of 20-pan for two sprinklers 10 centered over the ADD apparatus; 0.70 gal/min/ft$^2$ to 0.90 gal/min/ft$^2$ of a minimum of 20-pan for four sprinklers 10 centered over the ADD apparatus when the sprinkler(s) 10 is tested with an ADD apparatus in compliance with the parameters given in FM Global 2008, 2006 and 2032 (June 2000 and Suppl. September 2000). Notwithstanding the required ADDs (of FM Global 2008, 2006 and 2032 (June 2000 and Suppl. September 2000)), the preferred embodiments, in actual testing, successfully provided the required ADDs at the lower pressures of, respectively, approximately 35 psig and at approximately 50 psig—instead of 50 psig and 75 psig that are normally required. The ability of the preferred embodiment of the upright ESFR sprinkler to deliver the necessary ADD—but at 33% to 42% lower pressure—is believed to be an unexpected advantage in applications such as, for example, retrofitting older storage enclosures originally outfitted with non-ESFR upright sprinklers.

In a first test, an ignition source was centered under one upright sprinkler 10 of the preferred embodiment, with a ceiling height H of 30 feet, storage height SH at 19.5 feet, 4 inches wide of bar joist as obstruction and a commodity consisting of cartoned meat trays, the upright ESFR sprinkler 10 was able to suppress a fire at approximately 35 psig—instead of at 50 psig as is normally needed for a successful test (i.e., a 42% reduction in test pressure).

In a second test, an ignition source was centered under two sprinklers 10 of the preferred embodiment, with a ceiling height H of 30 feet, storage height SH at 24.5 feet, no obstruction and a commodity consisting of cartoned meat trays, the sprinklers 10 were able to provide the required ADD at approximately 35 psig—instead of at 50 psig as is normally needed for a successful test.

In a third test, an ignition source was centered under two sprinklers 10 of the preferred embodiment—but with one of the two sprinklers 10 plugged—with the ceiling height H of 30 feet. storage height SH of 24.5 feet, no obstruction and a commodity consisting of cartoned polystyrene, the remaining sprinkler 10 was able to suppress a fire at approximately 35 psig—instead of at 50 psig as is normally needed for a successful test.

In a fourth test, an ignition source was centered under one sprinkler 10 of the preferred embodiment with a ceiling height H of 35 feet, storage height SH at 24.5 feet or less, no obstruction and a commodity consisting of cartoned polystyrene, the sprinkler 10 was able to suppress a fire at approximately 50 psig—instead of at 75 psig as is normally needed for a successful test (i.e., a 33% reduction in test pressure).

In a fifth test, an ignition source was centered under two sprinklers 10 of the preferred embodiment with a ceiling height H of 35 feet, storage height SH at 29.5 feet or less, no obstruction and a commodity consisting of cartoned polystyrene, the sprinklers 10 were able to suppress a fire at approximately 50 psig—instead of at 75 psig as is normally needed for a successful test.

A plurality of the upright sprinkler 10 can be coupled with a fire suppression system that is installed in accordance with the incorporated by reference Standards Documents for various commodities such as cartoned meat trays 108, cartoned polystyrene 110 on open frame steel racks 132, encapsulated/unencapsulated commodity 112, cartoned-unexpanded plastic commodity 114, heavy weight roll paper 116, medium weight roll paper 118 on pallets 134, plastic coated heavy weight roll paper 120 on pallets 134, rubber tires on tread 124 on steel frame racks 130, or on sidewalls 122 stacked on steel frame racks 136, cartoned expanded plastic commodity 126 and uncartoned/unexpanded plastic commodity 128 (categorized as Class 1-Class 4 by FM Global) stored on pallets. The system is schematically illustrated here in FIG. 4 as being installed in a warehouse WH having a ceiling height of H. It should be noted that although the warehouse WH is illustrated with a flat roof, other types of roof can be used where the roof is situated higher than the ceiling height H.

An exemplary fire protection system utilizing the preferred embodiments of upright ESFR sprinklers—which can be designed and installed in accordance with the incorporated by reference Standards Documents—is illustrated in FIG. 4. In this example, water supply 100 under pressure is provided to a riser 102 with a predetermined diameter and length. The water supply 100 can be at a predetermined static pressure with a predetermined residual pressure and at a predetermined hose stream allowance, depending on the fire protection requirements of the storage to be protected. As used herein, the hose stream allowance requirement is the amount of water supply available for an automatic sprinkler system, as defined by the incorporated by reference Standards Documents. Preferably, the system has a system pressure of greater than 35 psig and provides a rated minimum flowing pressure of 35 psig so as to provide satisfactory operation of each upright sprinkler 10 in delivering a sufficient density of fluid that suppresses a fire. And as used herein, the minimum flowing pressure is the rated minimum flowing or operating pressure defined in accordance with the incorporated by reference Standards Documents.

As illustrated in FIG. 4, a riser 102 is coupled to a network of pipes having the supply 100, a main line 104 and a plurality of branch lines 106 located at a service height "h." The ESFR upright sprinklers 10 can be coupled to the lines 106 via sprinkler fittings TF at suitable distances of X feet and Y feet between sprinklers 10, depending on the specific fire suppression applications. Preferably, for ceiling up to 30 feet, a maximum distance X or Y is approximately twelve feet, and for ceiling higher than 30 feet, the maximum distance X or Y is approximately ten feet with a minimum distance X or Y, in both cases of approximately eight feet. Also preferably, the upright sprinkler is positioned so that a centerline of the trigger 63 is located at approximately 13 inches or less below the ceiling and a minimum distance of approximately 4 inches below the ceiling.

Hereafter, a method of suppressing a fire is described with reference to FIGS. 1-4. As described previously, water supply 100 is provided to a fire suppression system (FIG. 4). The pressurized water flows through the feed/riser 102 and to a main line 104 and branch lines 106 (located a sprinkler height "h") of the system to a plurality of upright sprinklers 10. At least one upright sprinkler 10 is oriented so that a flow of fluid issuing from the outlet opening 22 of the generally tubular body 20 of the sprinkler 10 is towards the ceiling of the warehouse WH. As a general rule, a deflector of an upright ESFR sprinkler is typically positioned such that the topmost portion of the deflector 82 is at least 3 inches below the ceiling H and the topmost portion of storage material SH is at least thirty-six inches below the topmost portion of the deflector 82.

Each upright sprinkler 10 can flown desired density of fluid at a rated minimum flowing pressure. For various configurations of the system, a minimum flowing pressure rating at each upright sprinkler can be related, among other factors, to the maximum height of the storage, the maximum height of the ceiling and the type(s) of commodity to be protected. In one preferred embodiment, the minimum flowing pressure rating at each sprinkler 10 in a system is approximately 50 psig so as to provide a sufficient density of fluid for suppression of a fire in a storage of various types of commodity (as described previously with reference to FM Global classification of commodities) at 32 feet or less and a ceiling height of 35 feet or less. In a more preferred embodiment, the minimum flowing pressure rating is 52 psig so as to provide a sufficient density of fluid for suppression of a fire in a storage of various types of commodity at 30 feet or less and a ceiling height of 35 feet or less.

In another preferred embodiment of the system, the minimum flowing pressure rating at each sprinkler 10 in a system is approximately 42 psig so as to provide a sufficient density of fluid for suppression of a fire in a storage of the various types of commodity at a maximum storage height of 29 feet or less and maximum ceiling height of 32 feet or less. In a more preferred embodiment, the minimum flowing pressure rating is 42 psig so as to provide a sufficient density of fluid for suppression of a fire in a storage of various types of commodity at 25 feet or less and a ceiling height of 32 feet or less.

In yet a further preferred embodiment of the system, the minimum flowing pressure rating at each sprinkler 10 is approximately 35 psig so as to provide a sufficient density of fluid for suppression of a fire in a storage of the various types of commodity at a maximum storage height of 27 feet or less and maximum ceiling height of 30 feet or less. In a more preferred embodiment, the minimum flowing pressure rating is 35 psig so as to provide a sufficient density of fluid for suppression of a fire in a storage of various types of commodity at 25 feet or less and a ceiling height of 30 feet or less.

In operation, a fluid (in this case, water under pressure) is retained within the system of FIG. 4 (i.e., in the main, branch lines 104, 106 and respective passageway 23 of the preferred embodiment of the ESFR upright sprinklers 10) due to the closed position of the respective closure assembly 30 of the sprinklers. When a fire of sufficient thermal energy is ignited proximate any of the ESFR upright sprinklers 10 of the system, the heat responsive trigger assembly 60 can activate the upright sprinkler 10. Specifically, when a sufficient amount of thermal energy is transferred (by convective, conductive or radiative heat transfer) to the heat responsive trigger 63, the fusible material changes from a solid state to a liquid state, allowing the two metallic links 64 and 65 to separate. The separation of the links 64 and 65 allows the hook 62 to generally pivot about the nose of the retaining member. The rotation of the hook 62 causes the strut 61 to rotate about the groove 33b of the closure assembly 30, thereby flinging the hook 62 and the strut 61 to one side of the longitudinal axis A-A. Since the closure assembly 30 is no longer constrained by the strut 61, the closure assembly 30 is ejected away from the outlet opening 22, in part, by the pressurized water in the passageway 23 along the longitudinal axis A-A, and in an oblique direction thereto by the ejection spring 36.

Water fed to the generally tubular body 20 from the supply can now flow through the outlet opening 22 in a first direction along the longitudinal axis A-A (which direction can be towards a ceiling) so as to be redirected in a second direction generally opposite the first in a generally hemispherical pattern by the deflector assembly 80. Hence, the flow of water through the ESFR upright sprinkler 10 suppresses the source of ignition by providing a sufficient density that can contain a fire or even to extinguish such a fire.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

[1. An upright, Early Suppression Fast Response (ESFR) sprinkler, comprising:

a generally tubular body defining a passageway along a longitudinal axis, the passageway having a K factor of at least 16.8, where the K factor equals the flow of water in gallons per minute through the passageway divided by the square root of the pressure of water fed to the body in pounds per square inch gauge (GPM/(psig)$^{1/2}$), the tubular body having an outer surface cincturing the passageway, the passageway having an inner surface spaced from the outer surface, an inlet opening at one end of the body and an outlet opening at another end with the passageway extending between the openings, the outer surface having pipe threads formed thereon;

at least one frame arm coupled to the body proximate the outlet, the at least one frame arm being formed as an unitary member with the tubular body;

a closure assembly positioned proximate the outlet opening so as to occlude the passageway, the closure assembly having a cylindrical portion coupled to a plate portion and a cup shaped portion contiguous to the plate portion, the closure assembly further having a metallic seal disposed between the cylindrical portion and the plate portion, and an ejection spring having a spring body and two distal spring ends, the spring body engaging the cup shaped portion with the spring ends engaging a portion of the at least one frame arm;

an unactuated heat responsive trigger assembly that retains the closure assembly proximate the outlet so as to close the passageway, the heat responsive trigger assembly having a Response Time Index of less than 40 meter$^{1/2}$second$^{1/2}$, the heat responsive trigger assembly having a strut, a hook, and a trigger, the strut having a first strut end engaging with the groove of the closure assembly and a second strut end coupled to a first notch of the hook, the hook end being coupled to the trigger; and a deflector assembly coupled with the body through the at least one frame arm so as to be spaced from and generally aligned with the outlet opening and the longitudinal axis, the deflector assembly including a nosepiece and an annular redirecting member, the nosepiece having a major deflecting surface facing the outlet and symmetric about the longitudinal axis, and a plate member coupled to the at least one frame arm and spaced from the outlet opening, the plate member including a first generally planar portion, a conical second portion that extends in an oblique direction relative to the longitudinal axis, and a third portion extending from the conical second portion at a second angle relative to the longitudinal axis, the third portion including a plurality of tines and a plurality of slots with at least one slot disposed between every two tines, the plurality of slots including at least one curved edge slot located on the second conical portion and at least one generally linear edge slot located on an intersection of the second conical portion and the third portion, so that, when the heat responsive trigger assembly is actuated and the closure is positioned to allow a flow of water to issue from the outlet opening of the body towards a ceiling to be redirected to provide a density of fluid that suppresses a fire in a storage situated beneath the ceiling.]

[2. An upright Early Suppression Fast Response (EFSR) sprinkler, comprising:

a body defining a passageway along a longitudinal axis, the passageway having a K factor of at least 16.8, where the K factor equals the flow of fluid in gallons per minute through the passageway divided by the square root of the pressure of fluid fed to the body in pounds per square inch gauge (GPM/(psig)$^{1/2}$);

at least one frame arm coupled to the body;

a closure assembly positioned proximate the body so as to occlude the passageway;

an unactuated heat responsive trigger assembly that retains the closure assembly proximate the body so as to close the passageway, the heat responsive trigger assembly having a Response Time Index (RTI) of less than 40 meter$^{1/2}$second$^{1/2}$; and a deflector assembly coupled with the body through the at least one frame arm so as to be spaced from and generally aligned with the passageway and the longitudinal axis so that, when the heat responsive trigger assembly is actuated and the closure is positioned to allow a flow of fluid to issue from the passageway of the body in a first direction towards a ceiling, the flow of fluid is redirected to a plurality of first flow paths, a plurality of second flow paths and a plurality o f third flow paths that suppress a fire in a commodity situated beneath the ceiling, the plurality of first plurality of flow paths being disposed at periodic intervals of approximately 90 degrees about the longitudinal axis, the first flow paths distributing fluid over a first distance from the longitudinal axis, the second plurality of flow paths distributing fluid over a second distance less than the first distance, and the third plurality of flow paths distributing fluid over an area between the first and second plurality of flow paths, the deflector assembly including an annular member being disposed about the longitudinal axis, the plurality of first flow paths commencing from the longitudinal axis at a first longitudinal distance from the outlet opening and distributing the fluid with a density sufficient to suppress a fire over the first distance, at least one of the plurality of second flow paths commencing from the longitudinal axis at a second longitudinal distance less than the first longitudinal distance from the outlet opening with a density sufficient to suppress a fire over the second distance.]

[3. The upright sprinkler of claim 2, wherein each of the plurality of first flow paths extends at a distance of approximately one hundred seventy (170) inches from the longitudinal axis so as to define four corners of a polygon with at least one hundred twenty (120) inches, approximately, for each side, the first, second, and third flow paths providing fluid with a combined density sufficient to suppress the fire beneath the ceiling.]

[4. An upright, Early Suppression Fast Response (ESFR) sprinkler, comprising:

a body defining a passageway along a longitudinal axis, the passageway having a K factor greater than 14, where the K factor equals the flow of fluid in gallons per minute through the passageway divided by the square root of the pressure of fluid fed to the body in pounds per square inch gauge (GPM/(psig)$^{1/2}$);

at least one frame arm coupled to the body;

a closure assembly positioned proximate the body so as to occlude the passageway;

an unactuated heat responsive trigger assembly that retains the closure assembly proximate the body so as to close the passageway, the heat responsive trigger assembly having a Response Time Index (RTI) of less than 40 meter$^{1/2}$second$^{1/2}$; and a deflector assembly coupled with the body through the at least one frame arm so as to be spaced from and generally aligned with the passageway and the longitudinal axis so that, when the heat responsive trigger assembly is actuated and the closure is positioned to allow a flow of fluid to issue from the passageway of the body in a first direction towards a ceiling, the flow of fluid is redirected to a second direction opposite the first direction to provide a density of fluid that suppresses a fire in a commodity situated beneath the ceiling, the body including a generally tubular body having an outer surface cincturing the passageway, the outer surface having threads formed on a portion of the body and a circumferential flange with flats formed on another portion of the body, the passageway having a changing cross-section as the passageway extends along the longitudinal axis between an inlet opening at one end of the body and an outlet opening at the other end, the deflector assembly including a plate member having a portion spaced axially from the outlet opening, the plate member further having a plurality of peripheral edges located axially between the portion of the plate member and the outlet opening, the plurality of peripheral edges being spaced apart from one another by a slot disposed between the plurality of peripheral edges, the plurality of peripheral edges defining the maximum diameter of the plate member.]

[5. The upright ESFR sprinkler according to claim 4, wherein the generally tubular body includes an axial length of at least 1.0 inch.]

[6. The upright ESFR sprinkler according to claim 4, wherein the passageway includes a conical surface between the inlet opening and outlet opening oriented at an angle of approximately 2 degrees to approximately 10 degrees with respect to the longitudinal axis.]

[7. The upright ESFR sprinkler according to claim 4, wherein the passageway includes a diameter greater than 0.70 inches.]

[8. The upright ESFR sprinkler according to claim 4, wherein the passageway includes is first stepped portion and a second beveled stepped portion radially spaced from the first stepped portion, the first portion having a seating surface for the closure assembly.]

[9. The upright ESFR sprinkler according to claim 4, wherein the closure assembly includes a cylindrical portion coupled to a plate portion and a cup shaped portion contiguous to the plate portion, a Belleville seal being disposed between the cylindrical portion and the plate portion, the cup shaped portion having a blind bore with a groove disposed proximate a bottom surface of the blind bore and a circumferential lip disposed proximate an opening of the blind bore, the closure assembly further comprises an ejection spring having a spring body and two distal spring ends, the spring body engaging one of the cup shaped portion and the heat responsive trigger assembly, and the spring ends engaging a portion of the body.]

[10. The upright ESFR sprinkler according to claim 4, wherein the heat responsive trigger assembly includes a strut, a hook, and a trigger, the strut having a first strut end engaging the closure assembly and a second strut end coupled to a first notch of the hook, the hook being connected at a first bookend of the hook to a portion of the deflector assembly via a second notch, the hook being coupled to the trigger at a second hook end, the trigger having two metallic links joined face to face by a thin layer of fusible material.]

[11. An upright, Early Suppression Fast Response (ESFR) sprinkler comprising:

a body defining a passageway along a longitudinal axis, the passageway having a K factor greater than 14, where the K factor equals the flow of fluid in gallons per minute through the passageway divided by the square root of the pressure of fluid fed to the body in pounds per square inch gauge (GPM/(psig)$^{1/2}$);

at least one frame arm coupled to the body;

a closure assembly positioned proximate the body so as to occlude the passageway;

an unactuated heat responsive trigger assembly that retains the closure assembly proximate the body so as to close the passageway, the heat responsive trigger assembly having a Response Time Index (RTI) of less than 40 meter$^{1/2}$second$^{1/2}$; and a deflector assembly coupled with the body through the at least one frame arm so as to be spaced from and generally aligned with the passageway and the longitudinal axis so that, when the heat responsive trigger assembly is actuated and the closure is positioned to allow a flow of fluid to issue from the passageway of the body in a first direction towards a ceiling, the flow of fluid is redirected to a second direction opposite the first direction to provide a density of fluid that suppresses a fire in a commodity situated beneath the ceiling, the body including a generally tubular body having an outer surface cincturing the passageway, the outer surface having threads formed on a portion of the body and a circumferential flange with opposite flats formed on another portion of the body, the passageway having a changing cross- section as the passageway extends along the longitudinal axis between an inlet opening at one end of the body and an outlet opening at the other end, the deflector assembly including a plate member having a portion spaced axially from the outlet opening, the plate member further having a plurality of peripheral edges located axially between the portion of the plate member and the outlet opening, the plurality of peripheral edges being spaced apart from one another by a slot disposed between the plurality of peripheral edges, the plurality of peripheral edges defining the maximum diameter of the plate member, the at least one frame arm includes two arms diametrically spaced apart about the longitudinal axis proximate the flange and converging towards one another towards the longitudinal axis, with a nosepiece disposed therebetween, the two arms formed of the same material as the nosepiece, a portion of each frame aim in the region adjacent the nosepiece is shaped and positioned to intercept at least a portion of a flow of a fluid issuing from the outlet opening of the body.]

[12. The upright ESFR sprinkler according to claim 11, wherein the two frame arms are formed as a unitary member with the body.]

[13. The upright ESFR sprinkler according to claim 11, wherein the plate member being coupled to the at least one frame arm, the nosepiece being symmetrical about the longitudinal axis and having a base portion secured to a face portion.]

[14. An upright, Early Suppression Fast Response ESFR sprinkler comprising:

a body defining a passageway along a longitudinal is, the passageway having a K factor greater than 14, where the K factor equals the flow of fluid in gallons per minute through the passageway divided by the square root of the pressure of fluid fed to the body in pounds per square inch gauge (GPM/(psig)$^{1/2}$);

at least one frame arm coupled to the body;

a closure assembly positioned proximate the body so as to occlude the passageway;

an unactuated heat responsive trigger assembly that retains the closure assembly proximate the body so as to close the passageway, the heat responsive trigger assembly having a Response Time Index (RTI) of less than 40 meter$^{1/2}$second$^{1/2}$; and a deflector assembly coupled with the body through the at least one frame arm so as to be spaced from and generally aligned with the passageway and the longitudinal axis so that, when the heat responsive trigger assembly is actuated and the closure is positioned to allow a flow of fluid to issue from the passageway of the body in a first direction towards a ceiling, the flow of fluid is redirected to a second direction opposite the first direction to provide a density of fluid that suppresses a fire in a commodity situated beneath the ceiling, the body including a generally tubular body having an outer surface cincturing the passageway, the outer surface having threads formed on a portion of the body and a circumferential flange wills flats formed on another portion of the body, the passageway having a changing cross-section as the passageway extends along the longitudinal axis between an inlet opening at one end of the body and an outlet opening at the other end, the deflector assembly including at least a plate member and a nosepiece, the plate member being coupled to the at least one frame arm and spaced from the outlet, the nosepiece being symmetrical about the longitudinal axis and having a base portion secured to a face portion, the plate member including a first generally planar portion located at a distance of at least 2.1 inches from the outlet opening, a conical second portion that extends in a first angle of between approximately 15 degrees and approximately 35 degrees relative to the longitudinal axis, and a third portion extending from the conical second portion at a second angle between approximately 7 degrees to approximately 17 degrees, the third portion including a plurality of tines and a plurality of slots with at least one slot disposed between every two tines.]

[15. The upright ESFR sprinkler according to claim 14, wherein the plurality of slots includes at least four scallop slots disposed about the longitudinal axis such that at least two scallop slots are radially spaced at approximately 90 degrees to each other about the longitudinal axis, and at least four scallop slots are radially spaced about the longitudinal axis at approximately 45 degrees about the longitudinal axis from the at least one frame arm.]

[16. The upright ESFR sprinkler according to claim 14, wherein the plurality of slots includes at least two scallop shaped slots spaced between four normal slots, each scallop slot having a curved edge located on the conical second portion, the curved edge connecting two obliquely extending edges of two adjacent tines, and each normal slot having a generally linear edge contiguous to the third portion, the linear edge connecting two obliquely extending edges of two adjacent tines.]

[17. The upright ESFR sprinkler according to claim 16, wherein the curved edge includes a radius of approximately 0.13 inches with a datum for a center of the radius located mid-way between the two side edges of the respective adjacent tines, the radial side edges of either the normal or the scallop slot being spaced apart at approximately 0.19 inches to approximately 0.21 inches and the respective centers of at least two diametrically opposing tines are on an axis passing through a center of each frame arm.]

[18. The upright ESFR sprinkler according to claim 14, wherein an outer perimeter of the peripheral edges of the tines defining a cross-sectional area of the plate member being at least 8 times an area of the minimum cross-sectional area of the passageway.]

[19. The upright ESFR sprinkler according to claim 4, wherein the closure is positioned, during actuation of the heat responsive trigger assembly, to allow a flow of fluid at one of approximately 35 or 50 pounds per square inch gauge (psig), to issue from the passageway of the body to provide the density of fluid that suppresses a fire in a commodity situated beneath the ceiling.]

[20. The upright ESFR sprinkler according to claim 4, comprising a minimum flowing pressure for design of a fire protection system of one of approximately 35, 42, or 52 pounds per square inch gauge (psig).]

[21. The upright ESFR sprinkler according to one of claim 19 or 20, wherein the storage is stored at a height of approximately 32 feet or less and the ceiling height is at approximately 35 feet or less.]

[22. The upright ESFR sprinkler according to claim 20, wherein the Response Time Index is approximately 23 $meter^{1/2}second^{1/2}$.]

[23. The upright ESFR sprinkler in according to claim 22, wherein the storage is situated in at least one of racks or open frame racks.]

[24. An upright, early suppression, fast response (ESFR) sprinkler, comprising:

a body defining a passageway along a longitudinal axis, the passageway having a minimum diameter of at least 0.77 inches, the body having an outlet opening adapted to face a ceiling and to provide a flow of fluid towards the ceiling;

at least one frame arm coupled to the body;

a closure assembly positioned proximate the outlet so as to occlude the passageway;

an unactuated heat responsive trigger assembly that retains the closure assembly proximate the body so as to close the passageway, the heat responsive trigger assembly having a Response Time Index (RTI) of approximately 40 $meter^{1/2}second^{1/2}$ or less; and means for redirecting a flow of fluid issuing from the body toward commodities situated beneath the ceiling at a density that suppresses a fire, the means for redirecting include a plate member and a nosepiece, the plate member being coupled to the at least one frame arm and spaced from the outlet opening, the plate member having a first generally planar portion located at a distance of at least 2.1 inches from the outlet opening, a conical second portion coupled to the first portion, and a third portion extending from the conical second portion toward the outlet opening, the plate member including a plurality of peripheral edges located axially between the first portion and the outlet opening, the plurality of peripheral edges being spaced apart from one another by a slot disposed between the plurality of peripheral edges, the plurality of peripheral edges defining the maximum diameter of the plate member.]

[25. The upright ESFR sprinkler of claim 24, wherein the passageway includes a K factor of at least 16.8, where the K factor equals the flow of water in gallons per minute through the passageway divided by the square mot of a predetermined pressure of water fed to the body in pounds per square inch gauge $(GPM/(psig)^{1/2})$.]

[26. The upright ESFR sprinkler according to claim 25, wherein the means for redirecting comprises a deflector assembly coupled to the body so that when the heat responsive trigger assembly is actuated, the closure assembly is positioned to allow a flow of fluid at a pressure of approximately 35 or 50 pounds per square inch gauge (psig) to issue from the passageway of the body at a density sufficient to suppress a fire in the commodity situated below the ceiling.]

[27. The upright ESFR sprinkler according to claim 25, wherein the means for redirecting comprises a deflector assembly coupled to the body so that when the heat responsive trigger assembly is actuated, the closure assembly is positioned to allow a flow of fluid to flow through the body at one of minimum flowing pressures of 35, 42, or 52 pounds per square inch gauge (psig) at a density sufficient to suppress a fire in the commodity situated below the ceiling.]

[28. The upright ESFR sprinkler according to claim 27, wherein the conical second portion extends at an angle of between approximately 15 degrees and 35 degrees relative to the longitudinal axis.]

[29. The upright ESFR sprinkler according to claim 27, wherein the plurality of slots includes at least four scallops slots disposed about the longitudinal axis such that at least two scallop slots are radially spaced at approximately 90 degrees to each other about the longitudinal axis, and at least four scallop slots are radially spaced about the longitudinal axis at approximately 45 degrees about the longitudinal axis from the at least one frame arm.]

[30. The upright ESFR sprinkler according to claim 27, wherein the plurality of slots includes at least two scallop shaped slots spaced between four normal slots, each scallop slot having a curved edge located on the second portion, the curved edge connecting two obliquely extending edges of two adjacent tines, and each normal slot having a generally linear edge contiguous to the third portion, the linear edge connecting two obliquely extending edges of two adjacent tines and at least two scallop slots are radially spaced at approximately 90 degrees to each other about the longitudinal axis, and at least four scallop slots radially spaced at approximately 45 degrees about the longitudinal axis from the at least one frame arm.]

[31. A fire suppression system of an enclosure having a floor and a ceiling of a preselected height from the floor and commodity stored in the enclosure, the system comprising:

a supply of fluid;

a network of pipes in fluid communication with the fluid supply, each pipe of the network having a plurality of sprinkler fittings;

at least one upright, early suppression, fast response (ESFR) sprinkler coupled to one of the plurality of sprinkler fittings, the upright ESFR sprinkler including:

a body having an inlet opening, an outlet opening and a passageway extending along a longitudinal axis between the inlet opening and the outlet opening, the outlet opening being oriented along the longitudinal axis to face the ceiling, and a K factor greater than 14, where the K factor equals the flow of fluid in gallon per minute through the passageway divided by the square root of the pressure of fluid being fed to the body in pounds per square inch gauge (GPM/(psig)$^{1/2}$);

an unactuated heat responsive trigger assembly, the heat responsive trigger assembly having a Response Time Index (RTI) of less than 40 meter$^{1/2}$second$^{1/2}$; and a deflector assembly coupled with the body so as to be spaced from and generally aligned with the outlet opening and the longitudinal axis so that a flow of fluid issuing from the outlet opening, and being deflected by the deflector assembly, is at a density sufficient to provide suppression of a fire of the commodity, the deflector assembly includes a plate member and a nosepiece, the plate member being coupled to the at least one frame arm and spaced from the outlet opening, the nosepiece being symmetrical about the longitudinal axis and having a base portion secured to a face portion, wherein the base portion includes a cylindrical surface and the face portion having a major deflecting surface facing and spaced from the outlet opening, the plate member including a plurality of peripheral edges located axially between the face portion and the outlet opening, the plurality of peripheral edges being spaced apart from one another by a slot disposed between the plurality of peripheral edges, the plurality of peripheral edges defining the maximum diameter of the plate member.]

[32. The system according to claim 31, wherein the at least one upright, early suppression, fast response (ESFR) sprinkler comprises a minimum flowing pressure rating selected from a group of design flowing pressures of approximately 35, 42, or 52 pounds per square inch gauge (psig).]

[33. The system according to claim 31, wherein the plate member includes a first generally planar portion and an aperture proximate the longitudinal axis, a conical second portion coterminous to the first portion and extends in a first angle of between approximately 15 degrees and 35 degrees relative to the longitudinal axis, and a third portion extending from the conical second portion at a second angle between approximately 7 degrees to approximately 17 degrees, the plurality of spaced apart peripheral edges being defined by a plurality of tines and a plurality of slots with at least one slot disposed between every two tines.]

[34. The system according to claim 33, wherein the plurality of slots includes at least two scallop shaped slots spaced between four normal slots, each scallop slot having a curved edge located on the second portion, the curved edge connecting two obliquely extending edges of two adjacent tines, and each normal slot having a generally linear edge contiguous to the third portion, the linear edge connecting two obliquely extending edges of two adjacent tines and at least two scallop slots are radially spaced at approximately 90 degrees to each other about the longitudinal axis, and at least four scallops slots radially spaced at approximately 45 degrees about the longitudinal axis from the at least one frame arm.]

[35. The system according to claim 34, wherein the peripheral edges defining a cross-sectional area of the plate member being at least 8 times an area of the minimum cross-sectional area of the passageway.]

[36. The system of claim 31, wherein at least one commodity includes at least one of encapsulated or unencapsulated commodities, cartoned unexpanded plastic commodities, heavy weight roll paper, plastic coated heavy weight roll paper, medium weight roll paper, rubber tires mounted on one side or on tread and non-interlaced, and cartoned expanded plastic commodities.]

[37. The system of claim 31, wherein the pressure of the fluid being fed to the body comprising approximately 35 pounds per square inch gauge (psig) with a height of at least one commodity being selected from a group of heights comprising approximately 19.5 feet and 24.5 feet or less and the height of the ceiling being approximately 30 feet or less from a floor.]

[38. The system of claim 31, wherein the K-factor comprises a K-factor of at least 16.8 and the pressure of the fluid being fed to the body comprises approximately 52 pounds per square inch gauge (psig) with a height of at least one commodity being selected from a group of heights comprising approximately 24.5 feet and 29.5 feet or less and the height of the ceiling being approximately 35 feet or less from a floor.]

[39. The system of claim 31, wherein the sprinkler comprises a minimum flowing pressure rating selected from a group of minimum flowing pressures of approximately 35, 42, or 52 pounds per square inch gauge (psig) with the height of the ceiling being three feet or higher than the maximum storage height.]

[40. The upright ESFR sprinkler according to any one of claims 1 or 2 comprising minimum flowing pressure for design of a fire protection system including one of approximately 35, 42, or 52 pounds per square inch gauge (psig).]

[41. The upright ESFR sprinkler according to claim 20, wherein the storage comprises storage of at least 19.5 feet from a floor below the ceiling and the sprinkler includes a minimum flowing pressure of one of approximately 35 or 42 pounds per square inch gauge (psig).]

[42. The upright ESFR sprinkler according to claim 20, wherein the storage comprises storage of at least 19.5 feet from a floor below the ceiling and the sprinkler comprises a minimum flowing pressure for design of a fire protection system approximately 52 pounds per square inch gauge (psig).]

[43. The upright ESFR sprinkler according to any one of claims 19 or 20, wherein the storage comprises storage of at least 29.5 feet from a floor below the ceiling and the sprinkler comprises a minimum flowing pressure for a design of a fire protection system of approximately 52 pounds per square inch gauge (psig) or less.]

44. An upright sprinkler for providing fire suppression protection in a storage enclosure, the sprinkler comprising:

a generally tubular body defining a passageway along a longitudinal axis, the body having an outer surface cincturing the passageway, the outer surface having threads formed on a portion of the body and a circumferential flange with flats formed on another portion of the body, the passageway having a changing cross-section as the passageway extends along the longitudinal axis between an inlet opening at one end of the body and an outlet opening at the other end, the passageway having a minimum diameter to define a minimum cross-sectional area of the passageway and a first diameter of the sprinkler, the passageway further having a K factor of about 25, where the K factor equals the flow of fluid in gallons per minute through the passageway divided by the square root of the pressure of fluid fed to the body in pounds per square inch gauge;

at least one frame arm coupled to the body;

a closure assembly positioned proximate the body so as to occlude the passageway;

an unactuated heat responsive trigger assembly that retains the closure assembly proximate the body so as to close the passageway; and a deflector assembly coupled with the body through the at least one frame arm so as to be spaced from and generally aligned with the passageway and the longitudinal axis so that, when the heat responsive trigger assembly is actuated and the closure assembly is positioned to allow a flow of fluid to issue from the passageway of the body in a first direction towards a ceiling of the storage enclosure so that the flow of fluid is redirected to a second direction opposite the first direction to provide a density of fluid for suppression of a fire in a commodity situated beneath the ceiling, the commodity being any one of stacked storage, storage on racks, palletized and solid pile classifiable Class I-IV and Group A unexpanded plastics, and cartoned plastic commodities, the deflector assembly including a redirecting member having a portion spaced axially from the outlet opening, the redirecting member further having a plurality of tines forming a plurality of peripheral edges located axially between the portion of the redirecting member and the outlet opening, the plurality of tines being spaced apart to form a plurality of slots, each slot having a linear edge connecting adjacent tines, the plurality of peripheral edges defining the maximum diameter of the redirecting member as a second diameter of the sprinkler and a cross-sectional area of the redirecting member, the ratio of the second diameter to the first diameter being at least 2.8 and the cross-sectional area of the redirecting member being at least 8 times the minimum cross-sectional area of the passageway.

45. The upright sprinkler according to claim 44, wherein the plurality of slots further includes at least two scallop shaped slots, each scallop slot having a curved edge connecting two adjacent tines.

46. The upright sprinkler according to claim 44, wherein the heat responsive trigger assembly has a Response Time Index (RTI) of less than 40 $meter^{1/2}second^{1/2}$.

47. The upright sprinkler according to claim 44, wherein the redirecting member comprises a plate member having a planar portion and a conical portion.

48. The upright sprinkler according to claim 44, wherein the generally tubular body includes an axial length of at least 1.0 inch.

49. The upright sprinkler according to claim 44, wherein the at least one frame arm includes two arms diametrically spaced apart about the longitudinal axis proximate the flange and converging towards one another towards the longitudinal axis with a nosepiece disposed therebetween, the two arms formed of the same material as the nosepiece, a portion of each frame arm in the region adjacent the nosepiece is shaped and positioned to intercept at least a portion of the flow of a fluid issuing from the outlet opening of the body.

50. The upright sprinkler according to claim 49, wherein the two frame arms are formed as a unitary member with the body.

51. The upright sprinkler according to claim 49, wherein the redirecting member is coupled to the at least one frame arm, the nosepiece being symmetrical about the longitudinal axis.

*52. The sprinkler of claim 44 or 46, wherein the trigger assembly has a temperature at which the trigger assembly actuates the sprinkler, the temperature being one of approximately 165 degrees Fahrenheit and approximately 214 Fahrenheit.*

*53. The upright sprinkler according to claim 44, wherein the upright sprinkler is an early suppression fast response (ESFR) sprinkler.*

*54. The upright sprinkler according to claim 44, wherein the upright sprinkler delivers a water density that defines an actual delivered density (ADD) for the sprinkler that is greater than a Required-Delivered-Density (RDD) for the commodity such that the suppression of the fire in the commodity provides that the fire does not spread beyond an initial ignition area of the fire.*

*55. The upright sprinkler according to claim 44, wherein the passageway having a first portion with a changing cross-section as the passageway extends along the longitudinal axis between the inlet opening at one end of the body and the outlet opening at the other end and a second portion with a constant cross-section as the passageway extends along the longitudinal axis between the inlet opening and the outlet opening.*

*56. The upright sprinkler according to claim 55, wherein the second portion of the passageway is proximate the outlet opening and the first portion of the passageway is disposed between a surface at the inlet opening which approximates a bell mouth portion and the second portion, the changing cross-section of the first portion of the passageway approximating a cone having a taper ranging between approximately two degrees to approximately ten degrees as measured with respect to the longitudinal axis.*

* * * * *